(12) United States Patent
Morita et al.

(10) Patent No.: US 10,647,865 B2
(45) Date of Patent: *May 12, 2020

(54) INK COMPOSITION

(71) Applicant: Seiko Epson Corporation, Tokyo (JP)

(72) Inventors: Keisuke Morita, Matsumoto (JP);
Yusuke Mizutaki, Shiojiri (JP);
Tomohito Nakano, Shiojiri (JP)

(73) Assignee: Seiko Epson Corporation (JP)

( * ) Notice: Subject to any disclaimer, the term of this patent is extended or adjusted under 35 U.S.C. 154(b) by 65 days.

This patent is subject to a terminal disclaimer.

(21) Appl. No.: 16/008,152

(22) Filed: Jun. 14, 2018

(65) Prior Publication Data

US 2018/0362788 A1 Dec. 20, 2018

(30) Foreign Application Priority Data

Jun. 15, 2017 (JP) ................................. 2017-117718

(51) Int. Cl.
| | | |
|---|---|---|
| *C09D 11/00* | (2014.01) | |
| *C09D 11/326* | (2014.01) | |
| *C09D 11/037* | (2014.01) | |
| *B41J 2/14* | (2006.01) | |
| *C09D 11/107* | (2014.01) | |
| *C09D 11/033* | (2014.01) | |
| *C09D 11/322* | (2014.01) | |
| *C09D 11/106* | (2014.01) | |
| *C09D 11/38* | (2014.01) | |

(52) U.S. Cl.
CPC ......... *C09D 11/326* (2013.01); *B41J 2/14233* (2013.01); *C09D 11/033* (2013.01); *C09D 11/037* (2013.01); *C09D 11/106* (2013.01); *C09D 11/107* (2013.01); *C09D 11/322* (2013.01); *C09D 11/38* (2013.01); *B41J 2002/14241* (2013.01); *B41J 2002/14419* (2013.01)

(58) Field of Classification Search
CPC ..... C09D 11/00; C09D 11/326; C09D 11/033; C09D 11/037; C09D 11/106; C09D 11/107; C09D 11/322; C09D 11/38; B41J 2/14233
USPC .......................................... 523/160; 524/556
See application file for complete search history.

(56) References Cited

U.S. PATENT DOCUMENTS

| | | |
|---|---|---|
| 5,976,233 A | 11/1999 | Osumi et al. |
| 6,280,513 B1 | 8/2001 | Osumi et al. |
| 7,955,425 B2 | 6/2011 | Koganehira et al. |
| 8,435,339 B2 | 5/2013 | Koyano et al. |
| 8,992,675 B2 | 3/2015 | Komatsu |
| 2001/0020431 A1 | 9/2001 | Osumi et al. |
| 2004/0114013 A1 | 6/2004 | Doi |
| 2008/0124476 A1 | 5/2008 | Tanba |
| 2013/0057625 A1* | 3/2013 | Yamazaki ............ C09D 11/322 347/100 |
| 2014/0022321 A1 | 1/2014 | Komatsu |
| 2014/0152739 A1* | 6/2014 | Fukuda ................ B41J 2/16535 347/31 |
| 2014/0295147 A1* | 10/2014 | Okuyama .............. B41J 2/2121 428/195.1 |
| 2015/0275014 A1 | 10/2015 | Yamazaki et al. |
| 2016/0016402 A1 | 1/2016 | Denda et al. |
| 2018/0265721 A1* | 9/2018 | Nakano ................ C09D 11/322 |

FOREIGN PATENT DOCUMENTS

| | | |
|---|---|---|
| JP | 62-001426 B2 | 1/1987 |
| JP | 03-056573 A | 3/1991 |
| JP | 03-079678 A | 4/1991 |
| JP | 03-160068 A | 7/1991 |
| JP | 04-018462 A | 1/1992 |
| JP | 10-195360 A | 7/1998 |
| JP | 2000-198955 A | 7/2000 |
| JP | 2010-270225 A | 12/2010 |
| JP | 2013-180434 A | 9/2013 |
| JP | 2013-230638 A | 11/2013 |
| JP | 2014-108593 A | 6/2014 |
| JP | 2015-199790 A | 11/2015 |
| JP | 2016-169322 A | 9/2016 |

OTHER PUBLICATIONS

U.S. Appl. No. 15/892,541, filed Feb. 9, 2018, Tomohito Nakano et al.

* cited by examiner

*Primary Examiner* — Hannah J Pak

(74) *Attorney, Agent, or Firm* — Harness, Dickey & Pierce, P.L.C.

(57) ABSTRACT

An ink composition includes 3-methyl-1,5-pentanediol; trimethylolpropane; water; and a pigment, in which no more than 0.5% by mass of 1,2-hexanediol is contained, and a mass ratio of the trimethylolpropane to the 3-methyl-1,5-pentanediol is 0.12 or more and 2 or less.

6 Claims, 6 Drawing Sheets

INK COMPOSITION

BACKGROUND

1. Technical Field

The present invention relates to an ink composition.

2. Related Art

An ink jet recording method is known in which minute ink droplets are ejected from nozzles of an ejection head of an ink jet recording apparatus to record an image on a recording medium, and in recent years, this method has come to be used in not only in the recording of images on recording media with excellent ink absorbency (for example, plain paper or the like), but also in the recording of images on (low absorbency) recording media with low ink absorbency (for example, art paper, coated paper, or the like) or (non-absorbent) recording media which absorb almost no ink (for example, a plastic film or the like). In addition, aqueous inks based on water have been used as the inks used in ink jet recording apparatuses from the viewpoints of the global environment, safety, and the like.

In a case of using an aqueous ink as an ink jet ink, the use of a self-dispersion type pigment as a pigment for the purpose of improving the pigment concentration and obtaining a good printing density while securing ejection stability is known (for example, refer to JP-A-2000-198955 and JP-A-10-195360). In addition, studies are being carried out to reduce volatile organic compounds (VOC) from the recorded images.

In inks using a self-dispersion type pigment as the pigment, it is possible to reduce the content of the resin for dispersing the pigment and, accordingly, it is possible to increase the pigment concentration by increasing the pigment content; however, when the content of the resin is reduced, the freezing point of the ink tends to be high and the ink tends to freeze easily. In particular, in a case where the ink is used for recording by an ink jet recording apparatus, the ejection head may be damaged (freezing cracks) when the ink is frozen in the ejection head, thus, there is a demand for an ink composition which does not freeze easily even if a self-dispersion type pigment is used, that is, an ink composition which has excellent low-temperature characteristics.

SUMMARY

An advantage of some aspects of the invention is to provide an ink composition excellent in low-temperature characteristics and ejection characteristics while reducing the amount of VOC generated.

The invention can be realized in the following aspects or application examples.

Application Example 1

According to an aspect of the invention, there is provided an ink composition including 3-methyl-1,5-pentanediol; trimethylolpropane; water; and a pigment, in which no more than 0.5% by mass of 1,2-hexanediol is contained, and a mass ratio of the trimethylolpropane to the 3-methyl-1,5-pentanediol is 0.12 or more and 2 or less.

According to the application example described above, the ink composition contains 3-methyl-1,5-pentanediol; trimethylolpropane; water; and a pigment, in which no more than 0.5% by mass of 1,2-hexanediol is contained, and a mass ratio of the trimethylolpropane to the 3-methyl-1,5-pentanediol is 0.12 or more and 2 or less, due to this, it is possible to provide an ink composition excellent in low-temperature characteristics and ejection characteristics while reducing the amount of VOC generated.

Application Example 2

In the application example described above, a content of 3-methyl-1,5-pentanediol may be 3% by mass or more and 8% by mass or less with respect to a total mass of the ink.

According to the application example described above, the content of 3-methyl-1,5-pentanediol being 3% by mass or more and 8% by mass or less with respect to the total mass of the ink further improves the ejection characteristics.

Application Example 3

In the application example described above, a content of the trimethylolpropane may be 1% by mass or more and 6% by mass or less with respect to the total mass of the ink.

According to the application example described above, the content of trimethylolpropane being 1% by mass or more and 6% by mass or less with respect to the total mass of the ink further improves the low-temperature characteristics and the ejection characteristics.

Application Example 4

In the application example described above, a self-dispersion type pigment may be included as the pigment.

According to the application example described above, including the self-dispersion type pigment as the pigment makes it possible to increase the pigment concentration in the ink, and to obtain excellent image quality.

Application Example 5

In the application example described above, it is preferable not to contain an organic solvent having a standard boiling point lower than 250° C.

According to the application example described above, not including the organic solvent having a standard boiling point lower than 250° C. further reduces the amount of VOC generated.

Application Example 6

In the application example described above, it is preferable to further contain diethylene glycol-2-ethylhexyl ether.

According to the application example described above, the ink composition further containing diethylene glycol-2-ethylhexyl ether makes it possible to obtain an ink composition excellent in low-temperature characteristics and ejection characteristics while further reducing the amount of VOC generated.

Application Example 7

In the application examples, the ink composition is able to be used in an ink jet recording apparatus provided with an ejection head which has a liquid flow path extending in a planar direction and having a vibrating plate, and a plurality of liquid flow paths connected to the liquid flow path in a vertical direction.

According to the application example, even in recording used in an ink jet recording apparatus provided with an ejection head having a liquid flow path extending in a planar direction and having a vibrating plate, and a plurality of liquid flow paths connected to the liquid flow path in a vertical direction, it is possible to obtain excellent low-temperature characteristics and ejection characteristics while reducing the amount of VOC generated.

BRIEF DESCRIPTION OF THE DRAWINGS

The invention will be described with reference to the accompanying drawings, wherein like numbers reference like elements.

DESCRIPTION OF EXEMPLARY EMBODIMENTS

A description will be given below of several embodiments of the invention. The embodiments described below illustrate one example of the invention. The invention is not limited to the following embodiments at all and includes various modifications carried out within a scope not changing the gist of the invention. Here, not all of the configurations described below are necessarily essential components of the invention.

The ink composition according to the present embodiment contains 3-methyl-1,5-pentanediol; trimethylolpropane; water; and a pigment, in which no more than 0.5% by mass of 1,2-hexanediol is contained, and a mass ratio of the trimethylolpropane to the 3-methyl-1,5-pentanediol is 0.12 or more and 2 or less.

A description will be given below of the ink composition (also referred to below as "ink") according to the present embodiment with reference to an ink jet recording apparatus to which the ink composition according to the present embodiment is able to be applied.

1. Configurations 1.1. Recording Apparatus

First, a description will be given of an example of a recording apparatus to which the ink composition according to the present embodiment is able to be applied by taking an ink jet recording apparatus as an example. Here, the recording apparatus to which the ink composition according to the present embodiment is able to be applied is not limited to the following aspect.

Figure 1:
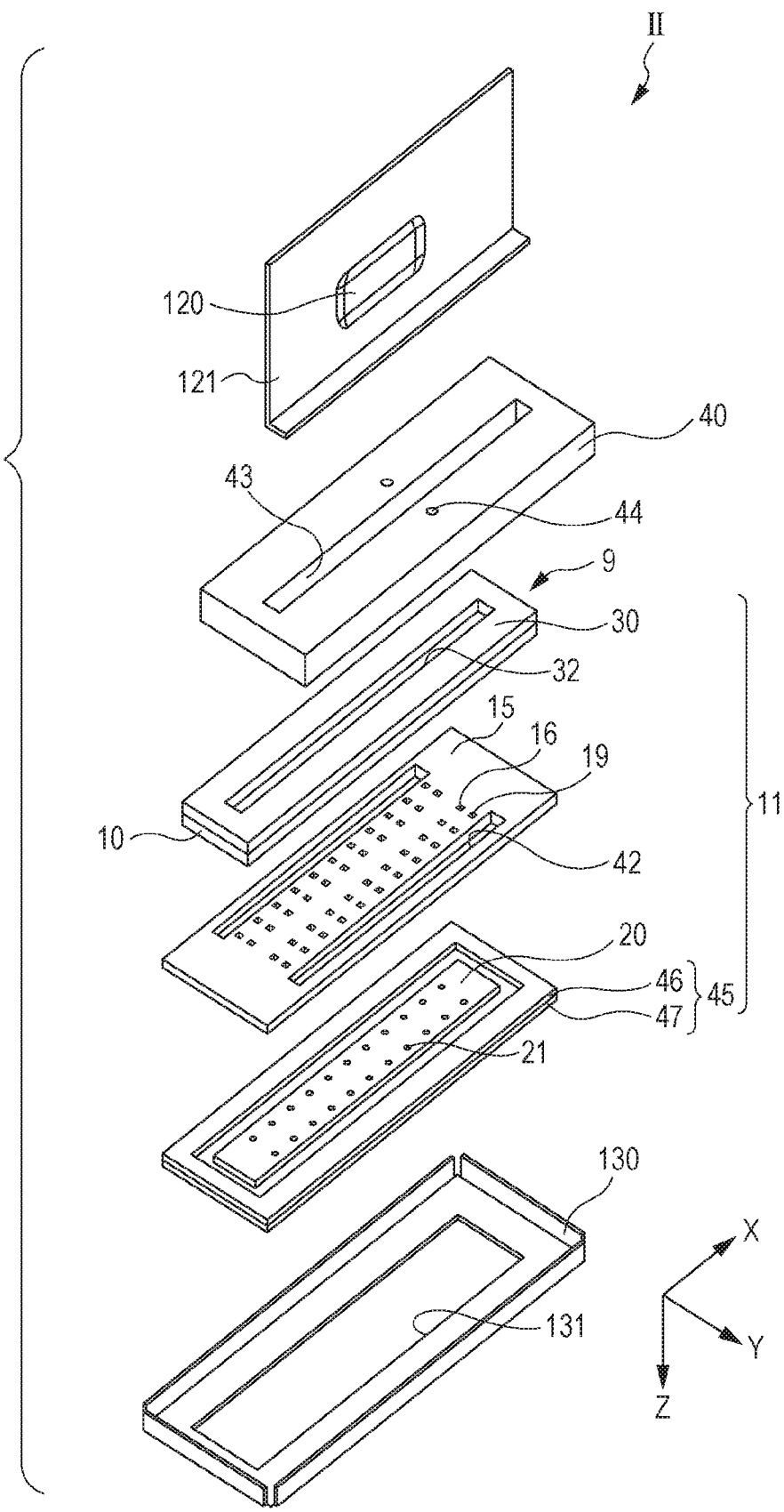
FIG. 1 is an exploded perspective view schematically showing an ejection head of an ink jet recording apparatus to which it is possible to apply the ink composition according to the present embodiment.
Figure 2:
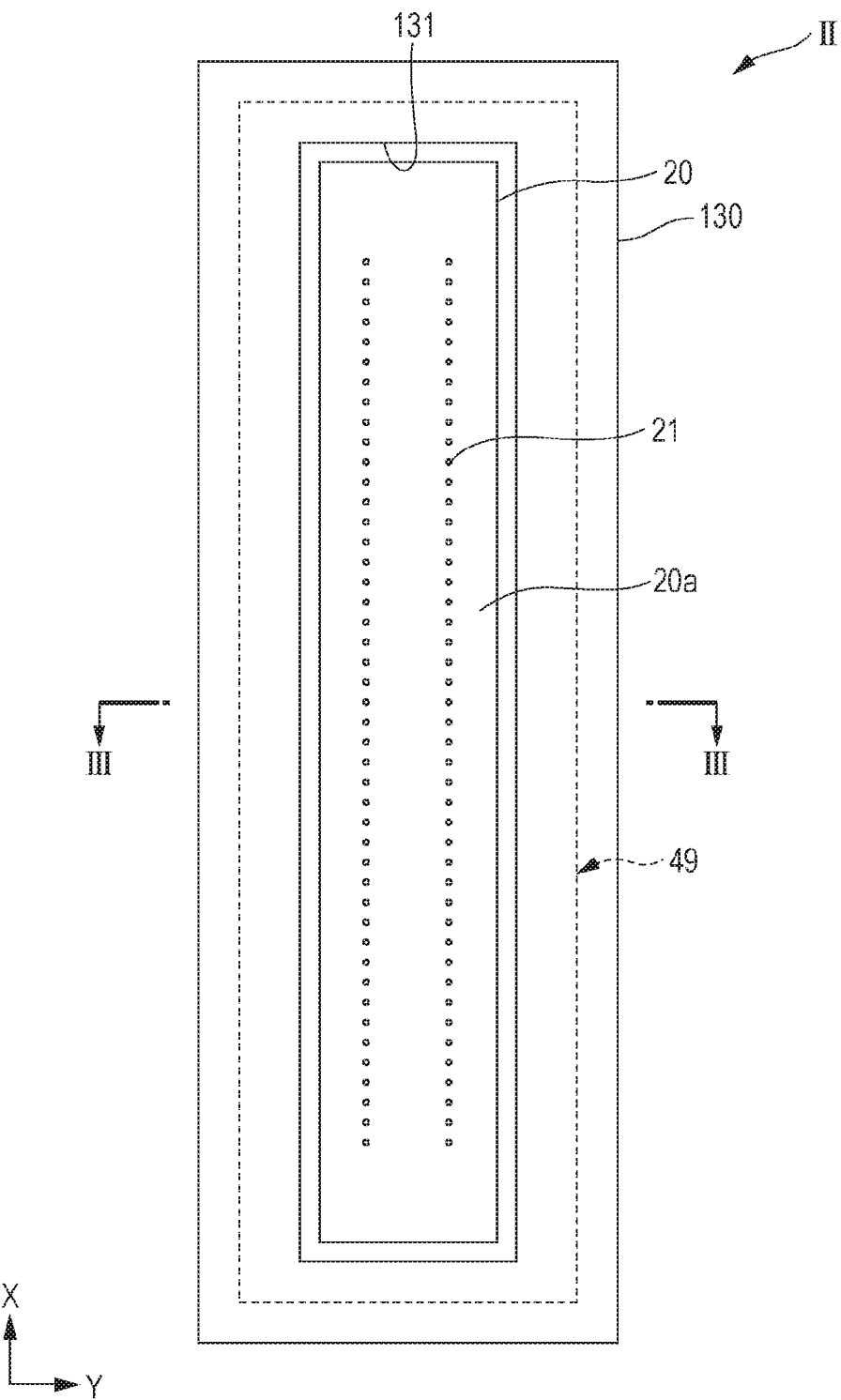
FIG. 2 is a plan view schematically showing an ejection head.
Figure 3:
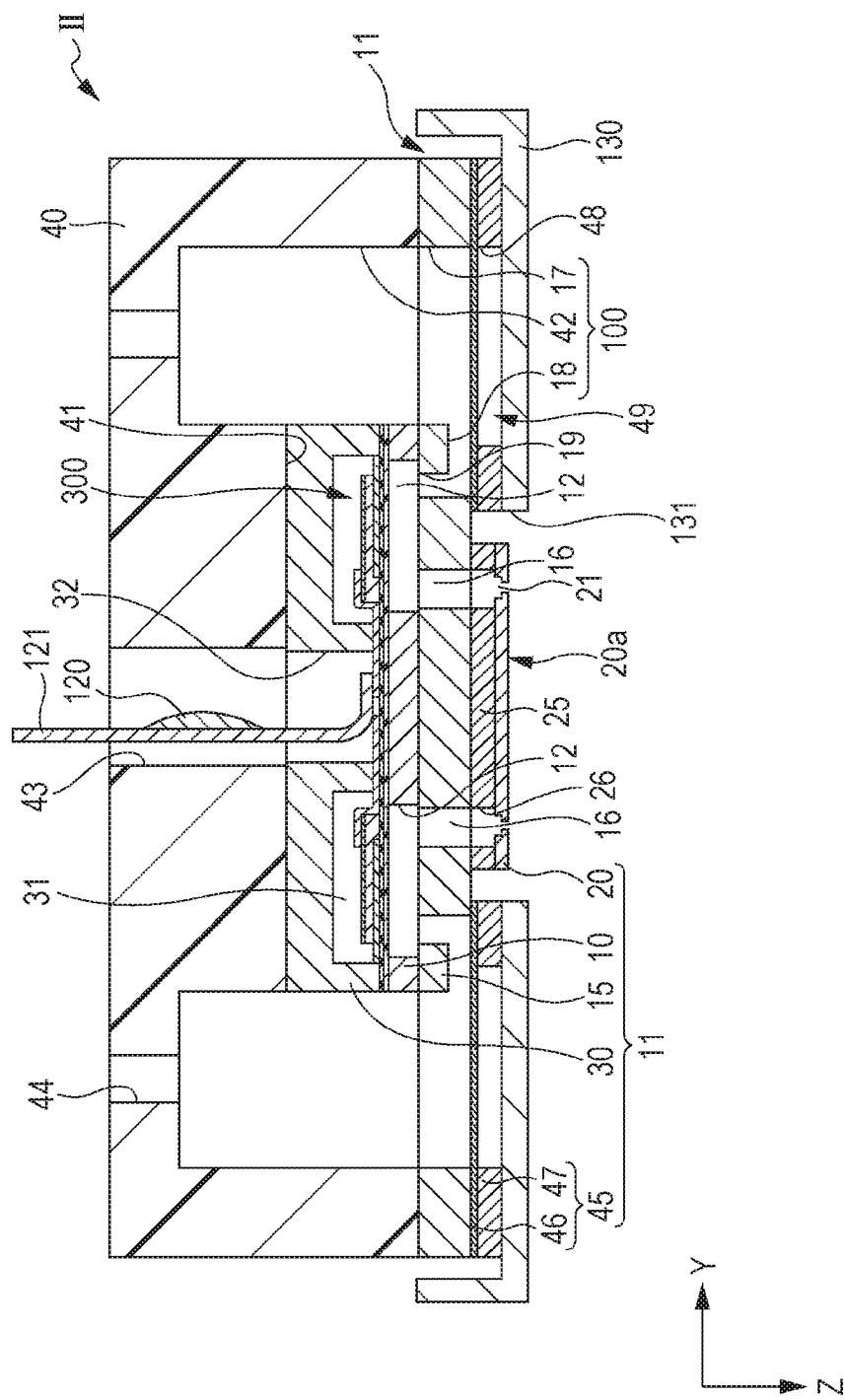
FIG. 3 is a cross-sectional view taken along line III-III of FIG. 2.
Figure 4:
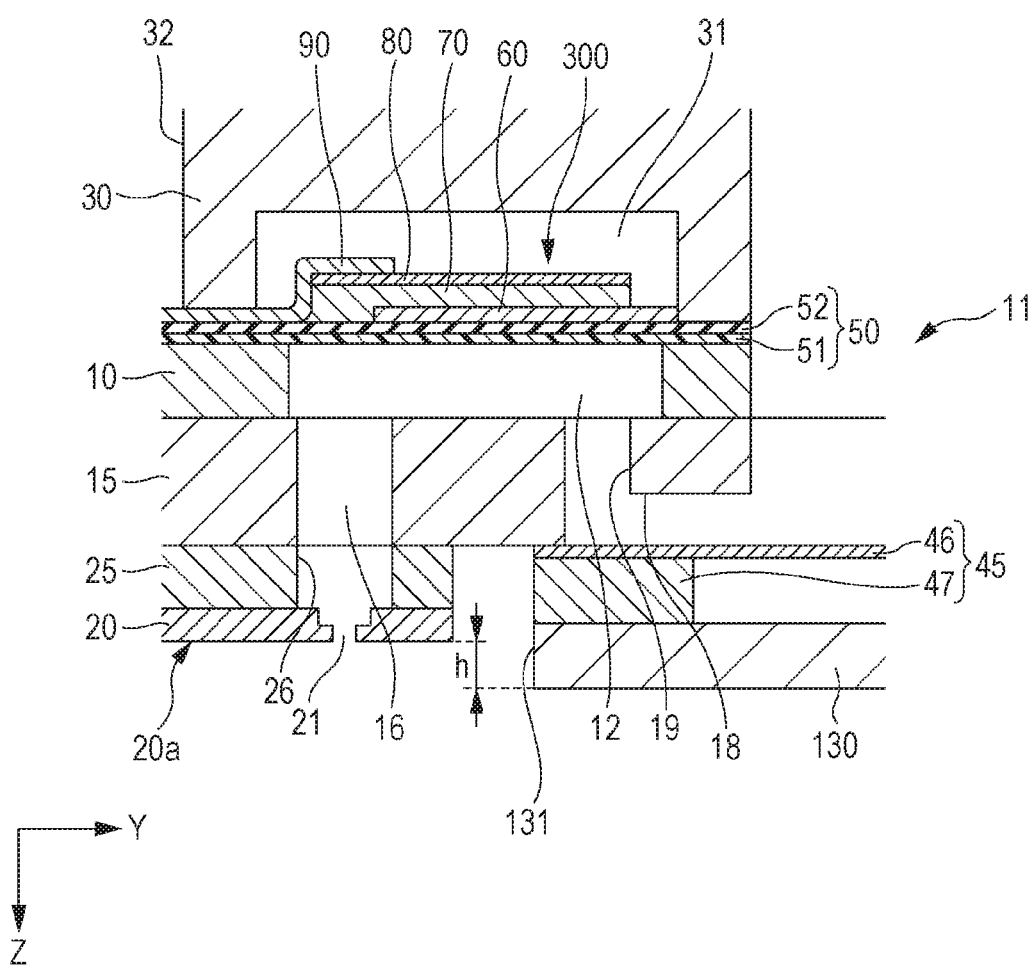
FIG. 4 is an enlarged cross-sectional view of a main portion of FIG. 3.

FIG. 1 is an exploded perspective view of an ink jet recording head which is an example of an ejection head of an ink jet recording apparatus. FIG. 2 is a plan view schematically showing an ink jet recording head. FIG. 3 is a cross-sectional view taken along line III-III of FIG. 2, and FIG. 4 is an enlarged cross-sectional view of the main portion of FIG. 3.

The ink jet recording head II is provided with a plurality of members such as a head main body 11, a case member 40 fixed to one surface side of the head main body 11, a cover head 130 fixed to the other surface side of the head main body 11, and the like. In the present embodiment, the head main body 11 is provided with a flow path-forming substrate 10, a communication plate 15, and a spacer 25 which are flow path members, a nozzle plate 20 attached to one surface side of the flow path member, a protective substrate 30, and a compliance substrate 45. The flow path member of the present embodiment is formed of the flow path-forming substrate 10, the communication plate 15, and the spacer 25. In addition, in the present embodiment, the protective member is formed of the compliance substrate 45 and the cover head 130 which is a protective plate.

The flow path-forming substrate 10 forming the head main body 11 is formed of a metal such as stainless steel or Ni, a ceramic material represented by $ZrO_2$ or $Al_2O_3$, a glass ceramic material, an oxide such as MgO or $LaAlO_3$, or the like. In the present embodiment, the flow path-forming substrate 10 is formed of a silicon single crystal substrate. By anisotropic etching from the one surface side of the flow path-forming substrate 10, pressure generating chambers 12 partitioned by a plurality of partition walls are lined up along the direction in which a plurality of nozzle openings 21 for ejecting ink are lined up (refer to FIG. 3 and FIG. 4). This direction is referred to below as the lining up direction of the pressure generating chambers 12 or the first direction X. In addition, in the flow path-forming substrate 10, a plurality of rows in which the pressure generating chambers 12 are lined up in the first direction X are provided and there are two rows in the present embodiment. The row direction in which a plurality of rows of the pressure generating chambers 12 in which the pressure generating chambers 12 are formed along the first direction X is referred to below as a second direction Y.

In addition, in the flow path-forming substrate 10, on the one end side of the pressure generating chambers 12 in the second direction Y, a supply path or the like may be provided having an opening area narrower than the pressure generating chamber 12 and imparting a flow path resistance to the ink flowing into the pressure generating chambers 12.

As shown in FIG. 3 and FIG. 4, the communication plate 15, the spacer 25, and the nozzle plate 20 are sequentially laminated on one surface side of the flow path-forming substrate 10. That is, on one surface side of the flow path-forming substrate 10, the communication plate 15 provided on one surface of the flow path-forming substrate 10, the spacer 25 provided on the communication plate 15 on the opposite surface side to the flow path-forming substrate 10, the nozzle plate 20 having a nozzle opening 21 provided on the spacer 25 on the opposite surface to the communication plate 15 are provided.

The communication plate 15 is provided with first nozzle communication paths 16 which communicate between the pressure generating chambers 12 and the nozzle opening 21. The communication plate 15 has a larger area than the flow path-forming substrate 10, and the nozzle plate 20 has a smaller area than the flow path-forming substrate 10. In this manner, providing the communication plate 15 makes it possible to separate the nozzle opening 21 of the nozzle plate 20 from the pressure generating chambers 12, thus the ink in the pressure generating chambers 12 is not easily affected by thickening due to evaporation of moisture in the ink generated in the ink near the nozzle opening 21. In addition, since the nozzle plate 20 only needs to cover the opening of the first nozzle communication path 16 which communicates between the pressure generating chamber 12 and the nozzle opening 21, it is possible to make the area of the nozzle plate 20 relatively small, and to achieve a reduction in the cost. Here, in the present embodiment, the nozzle opening 21 of the nozzle plate 20 is opened, and the surface onto which ink droplets are ejected is referred to as a liquid discharging surface 20a.

In addition, the communication plate 15 is provided with a first manifold portion 17 and a second manifold portion 18 which form a portion of a manifold 100. The first manifold portion 17 is provided so as to penetrate the communication plate 15 in the thickness direction (lamination direction of the communication plate 15 and the flow path-forming substrate 10).

In addition, the second manifold portion 18 is provided so as to open to the nozzle plate 20 side of the communication plate 15 without penetrating the communication plate 15 in the thickness direction. Furthermore, in the communication plate 15, a supply communication flow path 19 communicating with one end portion of the pressure generating chamber 12 in the second direction Y is independently provided for each pressure generating chamber 12. The supply communication flow path 19 communicates between the second manifold portion 18 and the pressure generating chamber 12.

As the communication plate 15, it is possible to use a metal such as stainless steel or Ni, a ceramic such as zirconium, or the like. Here, the communication plate 15 is preferably a material having the same coefficient of linear expansion as that of the flow path-forming substrate 10. That is, in a case where a material having a greatly different coefficient of linear expansion from the flow path-forming substrate 10 is used as the communication plate 15, warping may occur due to a difference in linear expansion coefficient between the flow path-forming substrate 10 and the communication plate 15 due to heating or cooling. In the present embodiment, using the same material as the flow path-forming substrate 10 as the communication plate 15, that is, a silicon single crystal substrate, makes it possible to suppress the occurrence of warpage caused by heating or cracks, peeling, and the like caused by heating.

The spacer 25 has substantially the same area (area in the first direction X and the second direction Y) as the nozzle plate 20. Therefore, the spacer 25 is provided only at the position where the nozzle plate 20 is attached. That is, the spacer 25 is not provided at a position where the compliance substrate 45, which is the protective member of the communication plate 15, is attached. Therefore, as will be described in detail below, the position where the nozzle plate 20 of the flow path member is attached, that is, the position of the surface of the spacer 25 to which the nozzle plate 20 is attached, and the position where the protective member of the flow path member (compliance substrate 45) is attached, that is, the position directly attached to the communication plate 15 are different positions in the ejecting direction of the ink droplets, that is, in the third direction Z which is the laminating direction of the communication plate 15 and the flow path-forming substrate 10.

A second nozzle communication path 26 communicating with the first nozzle communication path 16 and communicating with the nozzle opening 21 is provided in the spacer 25. That is, the pressure generating chamber 12 communicates with the nozzle opening 21 via the first nozzle communication path 16 of the communication plate 15 and the second nozzle communication path 26 of the spacer 25.

As the spacer 25, it is possible to use, for example, a metal such as stainless steel or Ni, or a ceramic such as zirconium or silicon. In the present embodiment, using the same silicon single crystal substrate as the communication plate 15 as the spacer 25 makes it possible to suppress the occurrence of warpage caused by heating and cooling or cracks, peeling, and the like caused by heating.

In addition, the spacer 25 may be selected such that a level difference h between the liquid discharging surface 20a and the surface of the cover head 130 (the surface on the side of the liquid discharging surface 20a) is a desired value, based on the laminated thickness (the total thickness in the third direction Z) of the compliance substrate 45 which is the protective member and the cover head 130 which is the protective plate, and the thickness of the nozzle plate 20.

The nozzle plate 20 is formed with the nozzle opening 21 communicating with each pressure generating chamber 12 via the first nozzle communication path 16 and the second nozzle communication path 26. That is, the nozzle openings 21 for discharging the same kind of liquid (ink) are lined up in the first direction X, and the rows of the nozzle openings 21 lined up in the first direction X form two rows in the second direction Y.

As the nozzle plate 20, it is possible to use, for example, a metal such as stainless steel (SUS), an organic material such as a polyimide resin, a silicon single crystal substrate, or the like. Here, using a silicon single crystal substrate as the nozzle plate 20 equalizes the linear expansion coefficients of the nozzle plate 20 and the communication plate 15, making it possible to suppress the occurrence of warpage caused by heating and cooling or cracks, peeling, and the like caused by heating.

On the other hand, a vibrating plate 50 is formed on the flow path-forming substrate 10 on the opposite surface side to the communication plate 15. In the present embodiment, as the vibrating plate 50, an elastic film 51 formed of silicon oxide provided on the flow path-forming substrate 10 side and an insulating film 52 formed of zirconium oxide provided on the elastic film 51 are provided. A liquid flow path such as the pressure generating chamber is formed by anisotropically etching the flow path-forming substrate 10 from one surface side (the surface side to which the nozzle plate 20 is bonded), and the other surface of the liquid flow path such as the pressure generating chamber 12 is defined by the elastic film 51.

In addition, the protective substrate 30 having substantially the same size as the flow path-forming substrate 10 is bonded to the surface of the flow path-forming substrate 10 on a piezoelectric actuator 300 side. The protective substrate 30 has a holding portion 31 which is a space for protecting the piezoelectric actuator 300.

The case member 40 which defines the manifold 100 communicating with the plurality of pressure generating chambers 12 together with the head main body 11 is fixed to the head main body 11 having such a configuration. The case member 40 has substantially the same shape as the communication plate 15 described above in a plan view and is bonded to the protective substrate 30 and also to the communication plate 15 described above. Specifically, the case member 40 has a recess portion 41 of a depth which accommodates the flow path-forming substrate 10 and the protective substrate 30 on the protective substrate 30 side. The recess portion 41 has an opening area larger than the surface of the protective substrate 30 bonded to the flow path-forming substrate 10. Then, in a state where the flow path-forming substrate 10 and the like are accommodated in the recess portion 41, the opening surface of the recess portion 41 on the side of the nozzle plate 20 is sealed by the communication plate 15. Due to this, a third manifold portion 42 is defined by the case member 40 and the head main body 11 on the outer peripheral portion of the flow path-forming substrate 10. The manifold 100 of the present embodiment is formed by the first manifold portion 17 and the second manifold portion 18 provided in the communication plate 15 and the third manifold portion 42 defined by the case member 40 and the head main body 11.

As the material of the case member 40, it is possible to use, for example, resin, metal, or the like. Here, molding a resin material as the case member 40 makes mass-production at low cost possible.

In addition, the compliance substrate 45 is provided on a surface of the communication plate 15 on which the first manifold portion 17 and the second manifold portion 18 are opened. The compliance substrate 45 seals the openings of the first manifold portion 17 and the second manifold portion 18 on the side of the liquid discharging surface 20a.

That is, in the present embodiment, the compliance substrate 45 forming the protective member is directly fixed to the communication plate 15. Accordingly, the position of the surface of the spacer 25 to which the nozzle plate 20 is attached and the position of the surface of the communication plate 15 to which the compliance substrate 45 as the protective member is attached on the side of the nozzle plate 20 are different positions in the third direction Z.

Here, that the position where the nozzle plate 20 is attached and the position where the protective member (in the present embodiment, the compliance substrate 45 forming the protective member) is attached are the same position in the flow path member in the third direction Z means, for example, being attached on the same plane of the communication plate 15. The plane of the communication plate 15 naturally includes height variations and the like due to processing errors when the surface of the communication plate 15 is processed into a plane shape. That is, the present embodiment is formed such that, instead of the nozzle plate 20 and the protective member being fixed to the same surface of the communication plate 15 processed on a plane, the nozzle plate 20 is attached to the surface of the spacer 25 by providing the spacer 25 at the position where the nozzle plate 20 is fixed on the communication plate 15, and the attachment positions of the nozzle plate and the protective member in the third direction Z are different.

In the present embodiment, the compliance substrate 45 is provided with a sealing film 46 and a fixed substrate 47. The sealing film 46 is formed of a thin film having flexibility (for example, a thin film formed of polyphenylene sulfide (PPS), stainless steel (SUS) or the like and with a thickness of 20 μm or less), and the fixed substrate 47 is formed of a hard material such as metal such as stainless steel (SUS). Since the region of the fixed substrate 47 opposing the manifold 100 is an opening 48 completely removed in the thickness direction, one surface of the manifold 100 forms a compliance portion 49 which is a flexible portion sealed only with the flexible sealing film 46.

Here, the case member 40 is provided with an introduction path 44 for communicating with the manifold 100 and supplying ink to each manifold 100. In addition, the case member 40 is provided with a connection port 43 which communicates with a through hole 32 of the protective substrate 30 and through which a wiring board 121 is inserted.

In addition, on the side of the liquid discharging surface 20a of the head main body 11, the cover head 130 which is the protective plate of the present embodiment is provided. The cover head 130 is bonded to the surface side of the compliance substrate 45 opposite to the communication plate 15 and seals the space on the opposite side of the flow path (the manifold 100) of the compliance portion 49. The cover head 130 is provided with an exposure opening 131 for exposing the nozzle opening 21. In the present embodiment, the size of the exposure opening 131 is such that the nozzle plate 20 is exposed, that is, the opening is the same as that of the compliance substrate 45.

In addition, in the present embodiment, the cover head 130 is provided with an end bent from the liquid discharging surface 20a side so as to cover a side surface (a surface intersecting the liquid discharging surface 20a) of the head main body 11.

In the ink jet recording head II having such a configuration, when discharging ink, ink is taken from an ink cartridge 2 via the introduction path 44, and the inside of the flow path is filled with ink from the manifold 100 to the nozzle opening 21. Thereafter, according to a signal from a driving circuit 120, a voltage is applied to each piezoelectric actuator 300 corresponding to the pressure generating chamber 12 to bend and deform the vibrating plate together with the piezoelectric actuator 300. Due to this, the pressure in the pressure generating chamber 12 increases, and ink droplets are discharged from the predetermined nozzle opening 21. In the present embodiment, from the connection port 43 of the ink jet recording head II to the nozzle opening 21 is referred to as a liquid flow path. That is, the liquid flow path is formed of the connection port 43, the manifold 100, the supply communication path 19, the pressure generating chamber 12, the first nozzle communication path 16, the second nozzle communication path 26, and the nozzle opening 21.

The ink jet recording head II having such a configuration has a liquid flow path (pressure generating chamber 12) extending in the planar direction (Y direction) having the vibrating plate 50, and a plurality of liquid flow paths (the supply communication flow path 19, the second nozzle communication path 26, and the first nozzle communication path 16) in the vertical direction (Z direction) connecting to the above liquid flow path. In the ink jet recording head II, in comparison with an ink jet recording head of the related art, the distance of the liquid flow path is longer and the volume of the liquid flow path is larger, thus it is possible to reduce the drying of the ink in the vicinity of the nozzle. This makes it possible to alleviate thickening of the ink in nozzles which do not eject ink, thus the ejection stability of the ink is improved.

On the other hand, it is understood that, when the ink jet recording head II filled with the ink containing the self-dispersion pigment is placed in a low temperature environment, the ink in the liquid flow path gradually starts freezing from the +Z direction side and the ink in the liquid flow path is gradually blocked from the +Z direction to the −Z direction such that the escape path of the ink disappears, and as a result, there is a problem in that the vibrating plate 50 and the piezoelectric element are damaged. This problem occurs in a case where ink containing a self-dispersion pigment is filled, but the detailed mechanism is not clear. In response to such a problem, in a case where the ink containing the self-dispersion pigment is filled in the ink jet recording head II having the structure described above, the invention successfully avoids cracks of the vibrating plate 50 and the piezoelectric element which are generated when the ink is frozen by means of an ink composition containing the self-dispersion type pigment.

Figure 5:
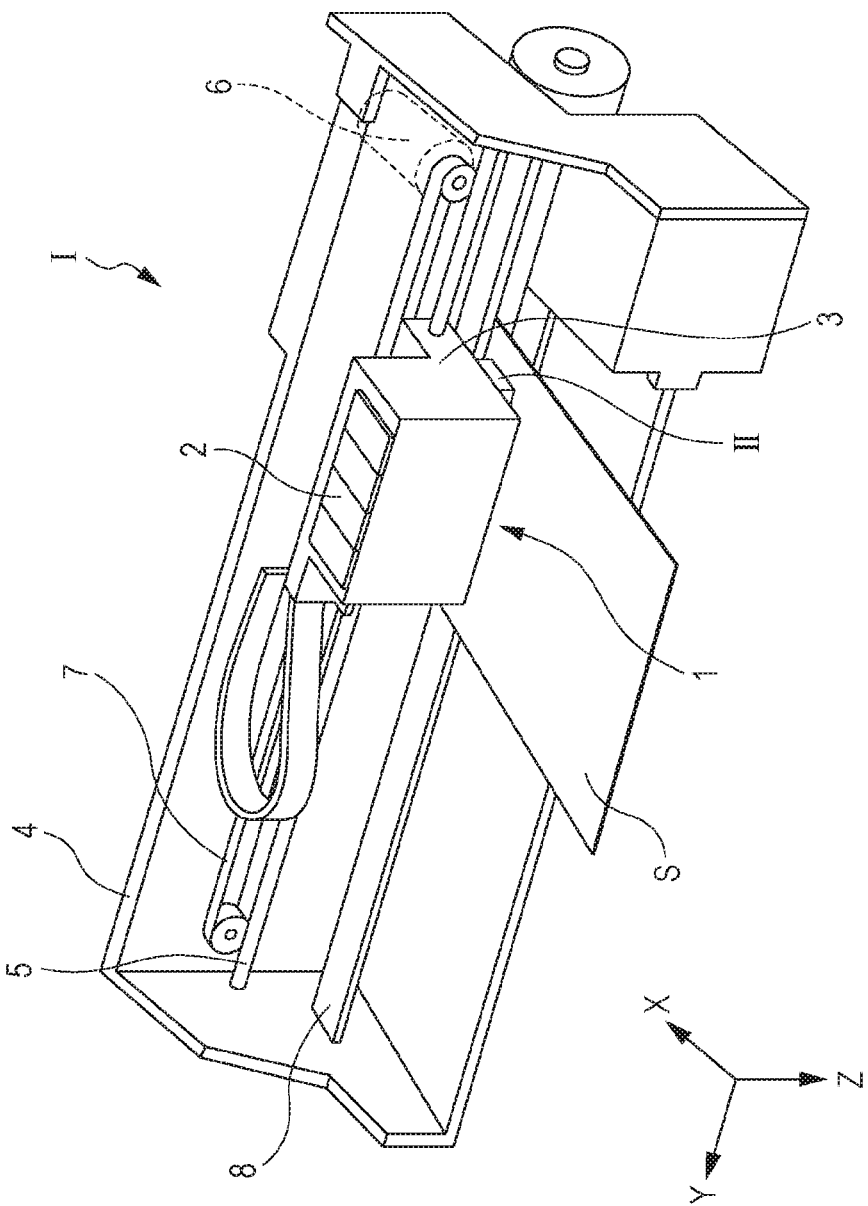
FIG. 5 a schematic view schematically showing an ink jet recording apparatus.

The ink jet recording head II forms a portion of an ink jet recording head unit provided with an ink flow path communicating with an ink cartridge or the like and is mounted in an ink jet type recording apparatus. FIG. 5 is a schematic view showing an example of the ink jet type recording apparatus.

In the ink jet type recording apparatus I shown in FIG. 5, an ink jet recording head unit 1 (also referred to below as a head unit 1) having a plurality of ink jet recording heads II is detachably provided with the cartridge 2 forming an ink supply means, and the carriage 3 on which the head unit 1 is mounted is provided to be movable in the axial direction on a carriage shaft 5 attached to an apparatus main body 4. For example, the recording head unit 1 ejects a black ink composition and a color ink composition, respectively.

Then, the driving force of the driving motor 6 is transmitted to the carriage 3 through a plurality of gears (not shown) and the timing belt 7 to move the carriage 3 on which the head unit 1 is mounted along the carriage shaft 5. On the other hand, in the apparatus main body 4, a platen 8 is provided along the carriage shaft 5, and a recording medium S such as paper fed by a paper feed roller (not shown) or the like is wrapped around the platen 8 and transported.

In the ink jet type recording apparatus I described above, the ink jet recording head II (head unit 1) is mounted on the carriage 3 and moves in the main scanning direction; however, the invention is not limited thereto and, for example, it is possible to apply the invention to a so-called line type recording apparatus in which the ink jet recording head II is fixed and printing is performed by simply moving the recording medium S such as paper in a sub-scanning direction.

In addition, in the example described above, the ink jet type recording apparatus I has a configuration in which the ink cartridge 2 is mounted on the carriage 3, but is not particularly limited thereto and, for example, an ink tank or the like may be fixed to the apparatus main body 4 and may be connected to the ink jet recording head II via a supply pipe such as a tube. In addition, the liquid storage means such as the ink cartridge 2 or the ink tank need not be mounted in the ink jet type recording apparatus.

Furthermore, the ink jet type recording apparatus I may be widely applied to liquid discharging heads in general, for example, recording heads such as various types of ink jet recording heads used in image recording apparatuses such as printers, color material discharging heads used in the manufacturing of color filters such as liquid crystal displays, electrode material discharging heads used for forming electrodes such as organic EL displays and field emission displays (FED), organic material discharging heads used for bio chip manufacturing, and the like.

In the ink jet type recording apparatus I, miniaturization and space saving are possible and the volume of the space upstream of the nozzle opening 21 is large, thus, diffusion occurs easily even if the ink in the vicinity of the nozzle opening 21 is dried and thickened and it is possible to alleviate thickening of the ink; however, when a self-dispersing type pigment is included in the ink and the ink is placed in a low temperature environment, the ink begins to freeze from the side of the nozzle plate and the liquid flow path of the ink is gradually blocked from the nozzle plate side, thus, the escape path for the volume expansion force of the ink disappears, which may cause a problem in that the vibrating plate 50 and the piezoelectric element are damaged. However, even with this ink jet type recording apparatus I, by using the ink composition according to the present embodiment described below, it is possible to prevent the generation of freezing cracks in the ejection head and to carry out recording with excellent ejection characteristics while reducing the amount of VOC generated at the time of recording. That is, even in recording using the ink jet recording apparatus (ink jet type recording apparatus I) provided with an ejection head (ink jet recording head II) having a liquid flow path (the pressure generating chamber 12) extending in the planar direction and having the vibrating plate 50 and a plurality of liquid flow paths in the vertical direction connected to the liquid flow path (the supply communication path 19, the second nozzle communication path 26, and the first nozzle communication path 16), it is possible to prevent the occurrence of freezing cracks and perform recording with excellent ejection characteristics while reducing the amount of VOC generated.

1.2. Ink Composition

The ink composition according to the present embodiment contains 3-methyl-1,5-pentanediol, trimethylolpropane, water, and a pigment, in which no more than 0.5% by mass of 1,2-hexanediol is contained, and a mass ratio of the trimethylolpropane to the 3-methyl-1,5-pentanediol is 0.12 or more and 2 or less. The ink composition according to the present embodiment may also contain, for example, a resin component or a surfactant. A description will be given below of the components included in the ink composition according to the present embodiment.

1.2.1. Organic Solvent

In the present embodiment, the ink composition contains an organic solvent. The organic solvent being contained in the ink composition makes the ejection stability excellent at the time of recording, makes the drying property of the ink composition ejected onto the recording medium good, and makes it possible to obtain an image excellent in image quality and abrasion resistance.

The organic solvent used in the ink composition preferably has a standard boiling point of 250° C. or higher. In addition, regarding an organic solvent having a standard boiling point lower than 250° C., more than 0.5% by mass is preferably not contained, 0.4% by mass or less is more preferable, 0.2% by mass or less is even more preferable, and not being contained is particularly preferable. Due to this, it is possible to provide an ink composition in which the amount of VOC generated is reduced.

The organic solvent used for the ink composition is preferably a water-soluble organic solvent. Using a water-soluble organic solvent makes the drying property of the ink composition good and makes it possible to obtain an image excellent in image quality and abrasion resistance.

The water-soluble organic solvent is not particularly limited, and examples thereof include 1,2-alkanediols, polyhydric alcohols (excluding 1,2-alkanediols), pyrrolidone derivatives, glycol ethers, and the like.

Examples of the 1,2-alkanediols include 1,2-propanediol, 1,2-butanediol, 1,2-pentanediol, 1,2-hexanediol, 1,2-octanediol, and the like. It is possible to use these singly or in a mixture of two or more kinds. The 1,2-alkanediols have an excellent action of increasing the wettability of the ink composition on the recording medium to uniformly wet the ink composition, and an excellent action as a penetrating solvent for the recording medium. In order to reduce the amount of VOC generated from the obtained image, for the content of the 1,2-alkanediols, more than 0.5% by mass of 1,2-alkanediols having a standard boiling point lower than 250° C. such as 1,2-hexanediols is preferably not contained, 0.4% by mass or less is preferable, 0.2% by mass or less is more preferable, and being not contained is even more preferable.

Examples of polyhydric alcohols (excluding 1,2-alkanediols) include ethylene glycol, diethylene glycol, triethylene glycol, propylene glycol, dipropylene glycol, 1,3-propanediol, 1,4-butanediol, 1,6-hexanediol, 2-ethyl-1,3-hexanediol, 3-methyl-1,5-pentanediol, glycerine, and the like. It is possible to use these singly or in a mixture of two or more kinds. Among these, from the viewpoint of reducing the amount of VOC generated from the obtained image, it is preferable to use triethylene glycol or glycerine. These polyhydric alcohols are preferably used from the viewpoint of having an action of suppressing drying and solidification of the ink on the nozzle surface of the ink jet recording head and preventing clogging of the nozzles, ejection defects, and the like.

The content of these polyhydric alcohols is preferably 1% by mass or more and 20% by mass or less with respect to the total mass of the ink composition, and more preferably 3% by mass or more and 15% by mass or less. In addition, in order to reduce the amount of VOC generated from the obtained image, more than 0.5% by mass of the polyhydric alcohol having a standard boiling point lower than 250° C. is preferably not contained, 0.4% by mass or less is more preferable, and being not contained is even more preferable.

Examples of the pyrrolidone derivatives include N-methyl-2-pyrrolidone, N-ethyl-2-pyrrolidone, N-vinyl-2-pyrrolidone, 2-pyrrolidone, N-butyl-2-pyrrolidone, 5-methyl-2-pyrrolidone, and the like. It is possible to use these singly or in a mixture of two or more kinds. The pyrrolidone derivative acts as a good dissolving agent for the resin, and it is possible to obtain recorded matter excellent in abrasion resistance and to prevent clogging of the ink jet recording head and the nozzle. In a case where a pyrrolidone derivative is used, the content of the pyrrolidone derivative is preferably 1% by mass or more and 20% by mass or less with respect to the total mass of the ink composition, and more preferably 3% by mass or more and 15% by mass or less. In order to reduce the amount of VOC generated from the obtained image, more than 0.5% by mass of the pyrrolidone derivative having a standard boiling point lower than 250° C. is preferably not contained, 0.4% by mass or less is more preferable, and being not contained is even more preferable.

Examples of glycol ethers include hexyl glycol, ethylene glycol monoisobutyl ether, ethylene glycol monohexyl ether, ethylene glycol monoisohexyl ether, diethylene glycol monohexyl ether, triethylene glycol monohexyl ether, diethylene glycol monoisohexyl ether, triethylene glycol monoisohexyl ether, ethylene glycol monoisoheptyl ether, diethylene glycol monoisoheptyl ether, triethylene glycol monoisoheptyl ether, ethylene glycol monooctyl ether, ethylene glycol monoisooctyl ether, diethylene glycol monoisooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol 2-ethylhexyl ether, diethylene glycol mono-2-ethylhexyl ether, ethylene glycol mono-2-methylpentyl ether, diethylene glycol mono-2-methylpentyl ether, diethylene glycol 2-ethylhexyl ether, propylene glycol monobutyl ether, dipropylene glycol monobutyl ether, tripropylene glycol monobutyl ether, propylene glycol monopropyl ether, dipropylene glycol monopropyl ether, tripropylene glycol monomethyl ether, diethylene glycol monophenyl ether, tetraethylene glycol monobutyl ether, and the like. It is possible to use these singly or in a mixture of two or more kinds. It is possible for glycol ethers to control the wettability and the like of the ink composition with respect to the recording medium.

The content of the glycol ethers is not particularly limited, and is, for example, preferably 1% by mass or more and 20% by mass or less with respect to the total mass of the ink composition, and more preferably 3% by mass or more and 15% by mass or less. In addition, in order to reduce the amount of VOC generated from the obtained image, more than 0.5% by mass of the glycol ethers having a standard boiling point lower than 250° C. is preferably not contained, 0.4% by mass or less is more preferable, and being not contained is even more preferable.

Among the above organic solvents, the ink composition according to the present embodiment contains 3-methyl-1, 5-pentanediol (also referred to below as "MPD"). MPD has a standard boiling point of 250° C., which is higher than the standard boiling point (224° C.) of 1,2-hexanediol (also referred to below as "1,2-HD") used in the related art as a penetrating agent for the recording medium. Therefore, replacing MPD with 1,2-HD makes it possible to provide an ink composition in which the amount of VOC generated from the recorded image is reduced.

The lower limit of the MPD content is preferably 3% by mass or more with respect to the total mass of the ink composition, more preferably 4% by mass or more, and even more preferably 5% by mass or more. In addition, the upper limit of the content of MPD in the ink composition is preferably 13% by mass or less, more preferably 10% by mass or less, and even more preferably 8% by mass or less. In a case where the content of MPD in the ink composition is within the above range, it is possible to prevent the occurrence of freezing cracks and to reduce the amount of VOC generated. In addition, since the dynamic surface tension of the ink does not rise excessively, the filling property is improved, the ejection characteristics are improved, and landing deviation is reduced. Furthermore, an image with excellent image quality is recorded.

Furthermore, among the organic solvents described above, the ink composition according to the present embodiment preferably contains diethylene glycol-2-ethylhexyl ether (also referred to below as "EHDG") which functions as a penetrating agent for the recording medium. Since EHDG has a standard boiling point of 272° C., containing EHDG makes it possible to provide an ink composition in which the amount of VOC generated from the recorded image is reduced.

In addition, EHDG being contained in the ink composition makes it possible to adjust the dynamic surface tension of the ink which rose with the inclusion of MPD. Adjusting the dynamic surface tension of the ink improves the filling property, improves ejection stability, and reduces landing deviation. Therefore, optimizing the amounts of MPD and EHDG in the ink makes it possible to obtain an ink composition excellent in low-temperature characteristics and ejection characteristics while reducing the amount of VOC generated.

Here, when the content of EHDG is excessively high, the EHDG is not dissolved in the ink, the ejection characteristics tend to decrease, and the storage stability of the ink tends to decrease. Accordingly, the lower limit of the content of EHDG is preferably 0.1% by mass or more with respect to the total mass of the ink composition, more preferably 0.15% by mass or more, and even more preferably 0.2% by mass or more. In addition, the upper limit of the content of EHDG in the ink composition is preferably 0.5% by mass or less, more preferably 0.45% by mass or less, and even more preferably 0.4% by mass or less. In a case where the content of EHDG is within these ranges, the ejection characteristics and image quality are further improved, and the storage stability of the ink is also improved.

In addition, organic solvents having a standard boiling point of 280° C. or higher may absorb moisture of the ink composition to increase the viscosity of the ink composition in the vicinity of the ink jet recording head and, due to this, the ejection stability of the ink jet recording head may decrease. Therefore, in the present embodiment, in the ink composition, the content of the organic solvent having a standard boiling point of 280° C. or higher is preferably 15% by mass or less, more preferably 13% by mass or less, and even more preferably 10% by mass or less. In such a case, since the drying property of the ink composition on the recording medium is increased, it is possible to form an excellent image in which the occurrence of bleeding is suppressed. In addition, stickiness of the obtained recorded matter is reduced, and the abrasion resistance is excellent. Examples of the organic solvent having a standard boiling point of 280° C. or higher include triethylene glycol and glycerine.

1.2.2. Water

In the present embodiment, the ink composition contains water. Water is the main medium of the ink composition and is a component which evaporates and scatters by drying. It is preferable that the water be obtained by removing ionic impurities as much as possible such as pure water or ultrapure water such as ion-exchanged water, ultra-filtered water, reverse osmosis water, distilled water, or the like. In addition, when using water sterilized by ultraviolet ray irradiation or the addition of hydrogen peroxide or the like, it is possible to suppress the generation of mold or bacteria in a case where the pigment dispersion and the ink composition using the same are stored for a long time, which is preferable.

The content of water is preferably 40% by mass or more with respect to the total mass of the ink composition, more preferably 50% by mass or more, and even more preferably 60% by mass or more.

1.2.3. Pigment

The ink composition according to the present embodiment contains a pigment. A pigment is preferably used due to having a property of being less faded by light, gas, and the like as compared with a dye, and images formed on a recording medium using pigments are excellent in water resistance, gas resistance, light fastness and the like and good in storage stability.

The pigment usable in the present embodiment is not particularly limited, and examples thereof include inorganic pigments and organic pigments. As the inorganic pigments, in addition to titanium oxide and iron oxide, it is possible to use carbon black manufactured by a known method such as a contact method, a furnace method, and a thermal method. On the other hand, as the organic pigment, it is possible to use azo pigments (including azo lakes, insoluble azo pigments, condensed azo pigments, chelate azo pigments, and the like), polycyclic pigments (for example, phthalocyanine pigments, perylene pigments, perinone pigments, anthraquinone pigments, quinophthalone pigments, and the like), nitro pigments, nitroso pigments, aniline black, and the like.

Specific examples of the pigment usable in the present embodiment include carbon black as the black pigment, and the carbon black is not particularly limited, and examples thereof include furnace black, lamp black, acetylene black, channel black, or the like (C.I. Pigment Black 7), as commercial products, No. 2300, 900, MCF 88, No. 20B, No. 33, No. 40, No. 45, No. 52, MA 7, MA 8, MA 77, MA 100, No. 2200B, and the like (the above are all trade names, manufactured by Mitsubishi Chemical Corp.), Color Black FW1, FW2, FW2V, FW18, FW200, 5150, 5160, 5170, Printex 35, U, V, 140U, Special Black 6, 5, 4A, 4, 250, and the like (the above are all trade names, manufactured by Degussa), Conductex SC, Raven 1255, 5750, 5250, 5000, 3500, 1255, 700, and the like (the above are all trade names, manufactured by Columbia Carbon Co., Ltd.), Regal 400R, 330R, 660R, Mogul L, Monarch 700, 800, 880, 900, 1000, 1100, 1300, 1400, Elftex 12, and the like (the above are all trade names, manufactured by Cabot Corp.).

The white pigment is not particularly limited, and examples thereof include C.I. Pigment White 6, 18, 21, white inorganic pigments of titanium oxide, zinc oxide, zinc sulfide, antimony oxide, magnesium oxide, and zirconium oxide. In addition to the white inorganic pigments, it is also possible to use a white organic pigment such as white hollow resin particles and polymer particles.

The pigment used for the yellow ink is not particularly limited, and examples thereof include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

The pigment used for the magenta ink is not particularly limited, and examples thereof include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245, or C.I. Pigment Violet 19, 23, 32, 33, 36, 38, 43, and 50.

The pigment used for the cyan ink is not particularly limited, and examples thereof include C.I. Pigment Blue 1, 2, 3, 15, 15:1, 15:2, 15:3, 15:34, 15:4, 16, 18, 22, 25, 60, 65, and 66, C.I. Vat Blue 4 and 60.

In addition, pigments used for color inks other than magenta, cyan, and yellow are not particularly limited, and examples thereof include C.I. Pigment Green 7, 10, C.I. Pigment Brown 3, 5, 25, 26, C.I. Pigment Orange 1, 2, 5, 7, 13, 14, 15, 16, 24, 34, 36, 38, 40, 43, and 63.

The pearl pigment is not particularly limited, and examples thereof include pigments having pearly luster and interference gloss such as titanium dioxide-coated mica, fish scale foil, and bismuth oxychloride.

The metallic pigment is not particularly limited, and examples thereof include particles formed of a single substance such as aluminum, silver, gold, platinum, nickel, chromium, tin, zinc, indium, titanium, and copper, or of alloys thereof.

The content of the coloring material able to be included in the ink composition is preferably 1.0% by mass or more and 40% by mass or less with respect to the total mass of the ink composition, more preferably 10% by mass or more and 30% by mass or less, and even more preferably 15% by mass or more and 25% by mass or less.

In order to apply the pigment described above to the ink composition, it is necessary to be able to stably disperse and hold the pigment in water. Examples of the method include a method of dispersing with a dispersant for a resin such as a water-soluble resin and/or a water-dispersible resin (the pigment dispersed by this method is referred to below as a "resin-dispersed pigment"), a method of dispersing with a water-dispersible surfactant and/or a pigment particle surfactant (the pigment dispersed by this method is referred to below as a "surfactant-dispersed pigment"), a method in which a hydrophilic functional group is chemically and physically introduced to the pigment particle surface and it is possible to carry out dispersing and/or dissolving in water without a dispersant such as the above resin or surfactant (the pigment dispersed by this method is referred to below as a "surface-treated pigment" or a "self-dispersion type pigment"), and the like. In the present embodiment, it is possible for the ink composition to use any of the resin-dispersed pigment, the surfactant-dispersed pigment, or the self-dispersion type pigment described above, and it is also possible to use a form of a mixture of plural kinds as required.

Examples of the resin dispersant used in the resin-dispersed pigment include polyvinyl alcohols, polyvinyl pyrrolidones, polyacrylic acid, acrylic acid-acrylonitrile copolymers, vinyl acetate-acrylic acid ester copolymers, acrylic acid-acrylic acid esters copolymers, styrene-acrylic acid copolymers, styrene-methacrylic acid copolymers, styrene-methacrylic acid-acrylic acid ester copolymers, styrene-α-methylstyrene-acrylic acid copolymers, styrene-α-styrene-acrylic acid-acrylic acid ester copolymers, styrene-maleic acid copolymers, styrene-maleic anhydride copolymers, vinylnaphthalene-acrylic acid copolymers, vinylnaphthalene-maleic acid copolymers, vinyl acetate-maleic acid ester copolymers, vinyl acetate-crotonic acid copolymers, vinyl acetate-acrylic acid copolymers, and the like, and salts thereof. Among these, in particular, a copolymer of a monomer having a hydrophobic functional group and a monomer having a hydrophilic functional group, and a polymer formed of a monomer having both a hydrophobic functional group and a hydrophilic functional group are preferable. As a form of the copolymer, it is possible to use any of a random copolymer, a block copolymer, an alternating copolymer, and a graft copolymer.

Examples of the salt include basic compounds such as ammonia, ethylamine, diethylamine, triethylamine, propylamine, isopropylamine, dipropylamine, butylamine, isobutylamine, diethanolamine, triethanolamine, tri-iso-propanolamine, aminomethylpropanol, and morpholine and salts thereof. The addition amount of these basic compounds is not particularly limited as long as the amount is the neutralization equivalent amount of the resin dispersant or more.

The molecular weight of the resin dispersant is preferably in the range of 1,000 or more and 100,000 or less as the weight average molecular weight, and more preferably in the range of 3,000 or more and 10,000 or less. When the molecular weight is within the above range, a stable dispersion of the coloring material in water is obtained, and viscosity control and the like are easy at the time of application to the ink composition.

It is also possible to use commercially available products as the resin dispersant described above. Specifically, examples thereof include Joncryl 67 (weight average molecular weight: 12,500, acid value: 213), Joncryl 678 (weight average molecular weight: 8,500, acid value: 215), Joncryl 586 (weight average molecular weight: 4,600, acid value: 108), Joncryl 611 (weight average molecular weight: 8,100, acid value: 53), Joncryl 680 (weight average molecular weight: 4,900, acid value: 215), Joncryl 682 (weight average molecular weight: 1,700, acid value: 238), Joncryl 683 (weight average molecular weight: 8,000, acid value: 160), Joncryl 690 (weight average molecular weight: 16,500, acid value: 240) (the above are trade names, manufactured by BASF Japan Ltd.), and the like.

Examples of the surfactant used in the surfactant-dispersed pigment include anionic surfactants such as alkane sulfonate, α-olefin sulfonate, alkylbenzene sulfonate, alkyl naphthalene sulfonate, acyl methyl taurate, dialkyl sulfosuccinate, alkylsulfate ester salt, sulfated olefin, polyoxyethylene alkyl ether sulfate ester salt, alkylphosphate ester salt, polyoxyethylene alkyl ether phosphate ester salt, and monoglyceride phosphate ester salt, amphoteric surfactants such as alkylpyridium salt, alkylamino acid salt, and alkyldimethylbetaine, nonionic surfactants such as polyoxyethylene alkyl ether, polyoxyethylene alkyl phenyl ether, polyoxyethylene alkyl ester, polyoxyethylene alkyl amide, glycerine alkyl ester, and sorbitan alkyl ester.

The addition amount of the resin dispersant or the surfactant to the pigment is preferably 1 part by mass or more and 100 parts by mass or less with respect to 100 parts by mass of the pigment, and more preferably 5 parts by mass or more and 50 parts by mass or less. Within this range, it is possible to secure the dispersion stability of the pigment in water.

In the ink composition according to the present embodiment, it is preferable to include a self-dispersion type pigment as a pigment. Here, the self-dispersion type pigment refers to a pigment which is able to be dispersed or dissolved in an aqueous medium without a dispersant, as described above. In this manner, the self-dispersion type pigment is manufactured by chemically and physically introducing a surface functional group (a carboxyl group or the like) in which ions in pigment particles repel each other in order that the pigment is able to be stably held in water. With the introduction of a hydrophilic functional group on the surface of the pigment, the self-dispersion type pigment is able to be stably dispersed in the ink composition due to the electrostatic repulsion between the pigments, without blending a resin dispersant or the like. In the present specification, the term "dispersion" refers to a state in which the self-dispersion type pigment is stably present in water without a dispersant and includes not only a dispersed state but also a dissolved state.

The ink composition blended with the self-dispersion type pigment has higher dispersion stability than the ordinary ink composition blended with the pigment other than the self-dispersion type pigment and the dispersant, thus, it is possible to reduce the content of the resin in the ink and to make the viscosity of the ink composition suitable. Due to this, it is possible to contain more pigment, and in particular, to form images such as letters and diagrams with excellent color properties on plain paper. Furthermore, the ink composition blended with the self-dispersion type pigment does not decrease in fluidity even if an organic solvent (described below) effective for improving the printing quality is blended therein. Therefore, using an organic solvent in combination therewith also makes it possible to improve the printing quality.

While there is an advantage to the above, when the content of the resin in the ink is decreased, the freezing point of the ink is increased and the ink tends to be frozen more easily. However, in the ink composition according to the present embodiment, using the composition of the organic solvent described above improves the low-temperature characteristics and prevents freezing of the ink. Due to this, it is possible to obtain an ink composition having excellent low-temperature characteristics and ejection characteristics while reducing the amount of VOC generated.

Examples of the self-dispersion type pigment include a hydrophilic functional group such as —OM, —COOM, —CO—, —SO$_3$M, —SO$_2$NH$_3$, —RSO$_3$M, —PO$_3$HM, —$PO_3M_3$, —$SO_3NHCOR$, —$NH_3$, —$NR_3$ (here, M in the formula represents a hydrogen atom, an alkali metal, ammonium, or organic ammonium, and R represents an alkyl group having 1 to 12 carbon atoms, a phenyl group which may have a substituent, or a naphthyl group which may have a substituent). These functional groups are physically and/or chemically introduced by grafting directly and/or via other groups on the pigment particle surface. Examples of the polyvalent group include an alkylene group having 1 to 12 carbon atoms, a phenylene group which may have a substituent, a naphthylene group which may have a substituent, and the like.

As the above self-dispersion type pigment, it is preferable to use a pigment which is surface-treated with a treating agent including sulfur such that —$SO_3M$ and/or —$RSO_3M$ (M is a counter ion and represents a hydrogen ion, an alkali metal ion, an ammonium ion, or an organic ammonium ion) is chemically bonded on the surface of the pigment particle, that is, the pigment is preferably a pigment not having active protons and not having reactivity with a sulfonic acid which is made to be dispersible and/or dissolvable in water by being dispersed in a solvent in which the pigment is insoluble or hardly soluble and then surface-treated with amidosulfuric acid or a complex of sulfur trioxide and a tertiary amine such that —$SO_3M$ and/or —$RSO_3M$ is chemically bonded to the particle surface.

As the surface treatment means for grafting the functional group or a salt thereof onto the surface of the pigment particle directly or via a polyvalent group, it is possible to apply various known surface treatment means. Examples thereof include a means for applying an ozone or a sodium hypochlorite solution to commercially available oxidized carbon black and further oxidize the carbon black to further hydrophilize the surface thereof (for example, JP-A-7-258578, JP-A-8-3498, JP-A-10-120958, JP-A-10-195331, and JP-A-10-237349), a means for treating carbon black with 3-amino-N-alkyl substituted pyridium bromide (for example, JP-A-10-195360 and JP-A-10-330665), a means in which an organic pigment is dispersed in a solvent in which the organic pigment is insoluble or hardly soluble, and a sulfone group is introduced onto the surface of the pigment particle using a sulfonating agent (for example, JP-A-8-283596, JP-A-10-110110, and JP-A-10-110111), a means in which an organic pigment is dispersed in a basic solvent which forms a complex with sulfur trioxide, the surface of the organic pigment is treated by adding sulfur trioxide, and a sulfone group or a sulfonamino group is introduced thereto (for example, JP-A-10-110114), and the like; however, the means for preparing the surface-treated pigment used in the invention is not limited to these means.

The functional group grafted to one pigment particle may be a single group or a plurality of kinds. The kind and degree of the functional groups to be grafted may be appropriately determined in consideration of the dispersion stability in the ink, the color density, the drying property on the front surface of the ejection head, and the like.

As methods of dispersing a resin-dispersed pigment, a surfactant-dispersed pigment, and a self-dispersion type pigment in water, it is possible to carry out the dispersion in a dispersing machine of the related art such as a ball mill, a sand mill, an attritor, a roll mill, an agitator mill, a Henschel mixer, a colloid mill, an ultrasonic homogenizer, a jet mill, or an Ong mill into which a pigment, water, and a resin dispersant are added for a resin dispersion type pigment, a pigment, water, and a surfactant are added for a surfactant dispersion type pigment, and a self-dispersion type pigment and water are added for a self-dispersion type pigment, and a water-soluble organic solvent, a neutralizing agent, and the like are added to each as necessary. In such a case, regarding the particle diameter of the pigment, dispersion is preferably carried out until the average particle diameter is in a range of 20 nm or more and 500 nm or less, and more preferably in a range of 50 nm or more and 200 nm or less, in terms of securing the dispersion stability of the pigment in water.

1.2.4. Trimethylolpropane

The ink composition according to the present embodiment includes trimethylolpropane. Trimethylolpropane is a polyol which is solid at ambient temperatures and which functions as an anti-freezing agent or moisturizing agent for ink. Therefore, including trimethylolpropane in the ink composition according to the present embodiment makes it possible to obtain an ink composition having excellent low-temperature characteristics and ejection characteristics while reducing the amount of VOC generated.

As described above, trimethylolpropane is contained in the present embodiment such that (3-methyl-1,5-pentanediol)/(trimethylolpropane) is 0.12 or more and 2 or less on a mass basis. Containing trimethylolpropane in such a range makes it possible to prevent the occurrence of freezing cracks and secure the ejection characteristics while reducing the amount of VOC generated.

In addition, the lower limit of the content of trimethylolpropane is preferably 1% by mass or more with respect to the total mass of the ink composition, more preferably 2% by mass or more, and even more preferably 3% by mass or more. In addition, the upper limit of the content of trimethylolpropane in the ink composition is preferably 6% by mass or less, more preferably 5% by mass or less, and even more preferably 4% by mass or less. In a case where the content of trimethylolpropane in the ink composition is within the above ranges, it is possible to prevent the occurrence of freezing cracks and to reduce the amount of VOC generated.

1.2.5. Resin Component

In the present embodiment, the ink composition may contain a water-soluble and/or water-insoluble resin component. The resin component has an action of solidifying the ink and fixing the solidified ink more firmly on the recording medium. The resin component may be in either a state of being dissolved in the ink composition or a state of being dispersed in the ink composition. As the resin component in the dissolved state, it is possible to use the resin dispersant described above used in a case where the pigment of the ink composition according to the present embodiment is dispersed. In addition, as the resin in the dispersed state, it is possible to disperse (that is, in an emulsion state or a suspension state) and include a resin component which is hardly soluble or insoluble in the form of fine particles in the liquid medium of the ink composition according to the present embodiment.

In addition to the resin used as the resin dispersant, examples of the resin component include a polyacrylic acid ester or a copolymer thereof, a polymethacrylic acid ester or a copolymer thereof, a polyacrylonitrile or a copolymer thereof, polycyanoacrylate, polyacrylamide, polyacrylic acid, polymethacrylic acid, polyethylene, polypropylene, polybutene, polyisobutylene, polystyrene or a copolymer thereof, petroleum resin, chroman-indene resin, terpene resin, polyvinyl acetate or a copolymer thereof, polyvinyl alcohol, polyvinyl acetal, polyvinyl ether, polyvinyl chloride or a copolymer thereof, polyvinylidene chloride, fluororesin, fluororubber, polyvinylcarbazole, polyvinylpyrrolidone or a copolymer thereof, polyvinyl pyridine, polyvinyl imidazole, polybutadiene or a copolymer thereof, polychloroprene, polyisoprene, natural resins, and the like. Among these, in particular, resin components having both a hydrophobic portion and a hydrophilic portion in the molecular structure are preferable.

In order to obtain the resin components described above in a fine particle state, the resin components may be obtained by the following methods, any of these methods may be used, and a plurality of methods may be combined as necessary. Examples of methods include a method in which a polymerization catalyst (polymerization initiator) and a dispersant are mixed in a monomer forming a desired resin component and polymerized (that is, emulsion polymerization), a method in which a resin component having a hydrophilic portion is dissolved in a water-soluble organic solvent and the water-soluble organic solvent is removed by distillation or the like after mixing the solution in water, a method in which a resin component is dissolved in a water-insoluble organic solvent and the solution is mixed with a dispersant in an aqueous solution, and the like. It is possible to appropriately select the method depending on the kind and characteristics of the resin components used. Dispersants which are able to be used when dispersing the resin component are not particularly limited, and examples thereof include anionic surfactants (for example, sodium dodecylbenzene sulfonate, sodium lauryl phosphate, polyoxyethylene alkyl ether sulfate ammonium salt, and the like), nonionic surfactants (for example, polyoxyethylene alkyl ether, polyoxyethylene alkyl ester, polyoxyethylene sorbitan fatty acid ester, polyoxyethylene alkyl phenyl ether, and the like), and it is possible to use these alone or in a mixture of two or more kinds.

In a case of the resin component as described above being used in the state of fine particles (emulsion state, suspension state), it is also possible to use resin components obtained using known materials and methods. For example, it is also possible to use resin components described in JP-B-62-1426, JP-A-3-56573, JP-A-3-79678, JP-A-3-160068, JP-A-4-18462, and the like. In addition, commercially available products can also be used, and examples thereof include Microgel E-1002, Microgel E-5002 (the above are trade names, manufactured by Nippon Paint Co., Ltd.), Boncoat 4001, Boncoat 5454 (the above are trade names, manufactured by DIC Corp.), SAE 1014 (trade name, manufactured by Zeon Corp.), Cybinol SK-200 (trade name, manufactured by Saiden Chemical Industry Co., Ltd.), Joncryl 7100, Joncryl 390, Joncryl 711, Joncryl 511, Joncryl 7001, Joncryl 632, Joncryl 741, Joncryl 450, Joncryl 840, Joncryl 74J, Joncryl HRC-1645J, Joncryl 734, Joncryl 852, Joncryl 7600, Joncryl 775, Joncryl 537J, Joncryl 1535, Joncryl PDX-7630A, Joncryl 352J, Joncryl 352D, Joncryl PDX-7145, Joncryl 538J, Joncryl 7640, Joncryl 7641, Joncryl 631, Joncryl 790, Joncryl 780, Joncryl 7610 (the above are trade names, manufactured by BASF Japan Ltd.), Dynaflow series (trade name, manufactured by JSR Corp.), and the like.

From the viewpoint of securing the storage stability and ejection stability of the ink composition in a case of using the resin component in a fine particle state, the average particle diameter thereof is preferably in the range of 5 nm or more and 400 nm or less, and more preferably in the range of 50 nm or more and 200 nm or less. The average particle diameter of the resin fine particles being within the above ranges makes the film forming properties excellent and makes it difficult for large lumps to form even when aggregated, which makes it possible to reduce nozzle clogging. The average particle diameter in this specification is on a volume basis unless otherwise specified. As a measuring method, for example, it is possible to carry out measurement using a particle diameter distribution measuring apparatus using dynamic light scattering theory as a measurement principle. An example of such a particle diameter distribution measuring apparatus is "Microtrac UPA" manufactured by Nikkiso Co., Ltd.

The glass transition temperature (Tg) of the resin is, for example, preferably −20° C. or higher and 100° C. or lower, and more preferably −10° C. or higher and 80° C. or lower.

The content of the resin component is preferably 0.1% by mass or more and 15% by mass or less in terms of solid content with respect to the total mass of the ink composition, more preferably 0.5% by mass or more and 10% by mass or less, even more preferably 2% by mass or more and 7% by mass or less, and particularly preferably 3% by mass or more and 5% by mass or less. Within these ranges, it is possible to solidify and fix the ink composition even on a non-ink absorbing or low-ink absorbing recording medium.

1.2.6. Surfactant

In the present embodiment, the ink composition preferably contains a surfactant. The surfactant is not particularly limited, and examples thereof include an acetylene glycol-based surfactant, a fluorine-based surfactant, and a silicone-based surfactant, and it is preferable that at least one kind thereof be contained, and among these, it is more preferable to contain a silicone-based surfactant. When the ink contains the silicone surfactant, the dynamic surface tension of the ink is lowered, and it is possible to further improve the ejection stability.

The acetylene glycol-based surfactant is not particularly limited, and examples thereof include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, DF110D (the above are all trade names, manufactured by Air Products Japan Co., Ltd.), Olfine B, Y, P, A, STG, SPC, E1004, E1010, PD-001, PD-002W, PD-003, PD-004, EXP. 4001, EXP. 4036, EXP. 4051, AF-103, AF-104, AK-02, SK-14, AE-3 (the above are all trade names, manufactured by Nissin Chemical Industry Co., Ltd.), Acetylenol E00, E00P, E40, and E100 (the above are all trade names, manufactured by Kawaken Fine Chemicals Co., Ltd.).

The silicone-based surfactant is not particularly limited and preferable examples thereof include polysiloxane-based compounds. The polysiloxane-based compound is not particularly limited, and examples thereof include a polyether-modified organosiloxane. Examples of commercially available products of the polyether-modified organosiloxane include BYK-306, BYK-307, BYK-333, BYK-341, BYK-345, BYK-346, and BYK-348 (the above are trade names, manufactured by BYK Japan KK), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (the above are trade names, manufactured by Shin-Etsu Chemical Co., Ltd.).

As the fluorine-based surfactants, a fluorine-modified polymer is preferably used and specific examples of the fluorine-based surfactants include BYK-340 (trade name, manufactured by BYK Japan K.K.).

In a case of containing a surfactant, it is possible to set the content to 0.1% by mass or more and 1.5% by mass or less with respect to the total mass of the ink composition, and preferably 0.5% by mass or more and 1% by mass or less.

1.2.7. Other Components

In the present embodiment, the ink composition may further contain a pH adjuster, a polyolefin wax, an antiseptic/fungicide, a rust inhibitor, a chelating agent, a moisturizing agent other than the organic solvent, and the like. When these materials are added, it is possible to further improve the properties of the ink composition.

Examples of the pH adjuster include potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, sodium bicarbonate, and the like.

Examples of the polyolefin waxes include waxes and copolymers thereof produced from olefins such as ethylene, propylene, and butylene and derivatives thereof, specifically, polyethylene wax, polypropylene wax, polybutylene wax, and the like. It is possible to use commercially available polyolefin waxes, specifically, it is possible to use Nopcoat PEM 17 (trade name, manufactured by San Nopco Ltd.), Chemipearl W4005 (trade name, manufactured by Mitsui Chemicals, Inc.), AQUACER 515, AQUACER 593 (the above are trade names, manufactured by BYK Japan K.K.) or the like.

When a polyolefin wax is added, it is possible to improve the slipping property with respect to physical contact of images formed on a non-ink absorbing or low-ink absorbing recording medium, and it is possible to improve the abrasion resistance of the image, which is preferable. The content of the polyolefin wax is preferably 0.01% by mass or more and 10% by mass or less with respect to the total mass of the ink composition, and more preferably 0.05% by mass or more and 1% by mass or less. When the content of the polyolefin wax is in the above range, the effects described above are sufficiently exhibited.

Examples of the antiseptic/fungicide include sodium benzoate, sodium pentachlorophenol, sodium 2-pyridinethiol-1-oxide, sodium sorbate, sodium dehydroacetate, 1,2-dibenzisothiazolin-3-on, and the like. Examples of commercially available products include Proxel XL 2, Proxel GXL (the above are trade names, manufactured by Avecia Ltd.), Denicide CSA, NS-500 W (the above are trade names, manufactured by Nagase ChemteX Corp.), and the like.

Examples of rust inhibitors include benzotriazole and the like.

Examples of the chelating agent include ethylenediaminetetraacetic acid and salts thereof (disodium dihydrogen ethylenediaminetetraacetate salt, and the like) and the like.

Examples of the moisturizing agents other than organic solvents include sugar and the like.

1.2.8. Method for Preparing Ink Composition

The ink composition according to the present embodiment is obtained by mixing the components described above in an arbitrary order and carrying out filtration or the like to remove impurities as necessary. As a method of mixing the respective components, a method is suitably used in which materials are sequentially added to a container equipped with a stirrer such as a mechanical stirrer, or a magnetic stirrer, and stirring and mixing are carried out. As a filtration method, it is possible to carry out centrifugal filtration, filter filtration, and the like as necessary.

1.2.9. Physical Properties of Ink Composition

From the viewpoint of a balance between image quality and reliability as ink for ink jet recording, the ink composition according to the present embodiment preferably has a surface tension at 20° C. of 20 mN/m or more and 40 mN/m or less, and more preferably 20 mN/m or more and mN/m or less. Here, it is possible to measure the surface tension, for example, by confirming the surface tension when a platinum plate is wetted with ink in an environment of 20° C. using an automatic surface tensiometer CBVP-Z (trade name, manufactured by Kyowa Interface Science Co., Ltd.).

In addition, from the same viewpoint, the viscosity of the ink composition according to the present embodiment at 20° C. is preferably 3 mPa·s or more and 10 mPa·s or less, and more preferably 3 mPa·s or more and 8 mPa·s or less. It is possible to measure the viscosity in an environment of 20° C. using a viscoelasticity tester MCR-300 (trade name, manufactured by Physica), for example.

1.2.10. Applications

Since the ink composition according to the present embodiment does not contain 1,2-hexanediol in an amount of more than 0.5% by mass, the amount of VOC generated at the time of recording and from the recorded matter is reduced. In addition, by containing 3-methyl-1,5-pentanediol and trimethylolpropane and having a mass ratio of trimethylolpropane to 3-methyl-1,5-pentanediol of 0.12 or more and 2 or less, it is possible to prevent the occurrence of freezing cracks in the ejection head and to obtain an ink composition excellent in low-temperature characteristics and ejection characteristics. Furthermore, containing water and a pigment makes it possible to obtain an excellent image quality. Therefore, use is possible for recording on various recording media. In particular, preferable use is possible in an ink jet recording apparatus provided with an ejection head having a liquid flow path extending in a planar direction and having a vibrating plate and a plurality of liquid flow paths connected to the liquid flow path in a vertical direction, as described above, and it is possible to perform recording with excellent low-temperature characteristics and ejection characteristics while reducing the amount of VOC generated.

In the present embodiment, the recording medium to be printed is not particularly limited, and it is possible to use low absorbent or non-absorbent coated paper and plastic films in addition to a cloth such as cotton, silk, polyester, polyurethane, or nylon having high ink absorbency, or plain paper, special ink jet paper, medium absorbent high-quality paper, and copy paper.

The low absorption recording medium is not particularly limited and examples thereof include a coated paper provided with a coating layer formed by applying a coating material on a surface. The coated paper is not particularly limited and examples thereof include printing paper such as art paper, coated paper, and matte paper.

The non-absorbent recording medium is not particularly limited and examples thereof include a plastic film not having an ink absorbing layer, a medium in which plastic is coated on a base material such as paper, a medium to which a plastic film is adhered, or the like. Examples of plastics here include polyvinyl chloride, polyethylene terephthalate, polycarbonate, polystyrene, polyurethane, polyethylene, polypropylene, and the like. In this specification, a non-ink absorbing or low-ink absorbing recording medium is also referred to simply as "plastic medium".

Herein, the "non-ink absorbing or low-ink absorbing recording medium" in the present specification means "a recording medium having a water absorption amount of 10 mL/m$^2$ or less from the contact start to 30 msec$^{1/2}$ in the Bristow method". This Bristow method is the most popular method as a method for measuring the amount of liquid absorption in a short time and is also adopted by Japan Technical Association of the Pulp and Paper Industry (JAPAN TAPPI). For the details of the test method, please refer to the standard No. 51 "Paper and paperboard—Liquid absorbency test method—Bristow method" OF "JAPAN TAPPI 2000 Paper Pulp Test Method".

The recording on the recording medium by the ink jet recording method is recording in which the ink composition according to the present embodiment is ejected from an ink jet type ejection head to carry out recording on the recording medium.

Since the ink composition according to the present embodiment does not contain 1,2-hexanediol in an amount of more than 0.5% by mass as described above, by recording using such an ink, the amount of VOC generated from the obtained recorded matter is reduced. In addition, the ink composition according to the present embodiment contains 3-methyl-1,5-pentanediol and trimethylolpropane, and the mass ratio of trimethylolpropane to 3-methyl-1,5-pentanediol is 0.12 or more and 2 or less, thus the low-temperature characteristics are excellent. In particular, the occurrence of freezing cracks in the ink including the self-dispersion type pigment is prevented, and it is possible to obtain the ink composition having excellent low-temperature characteristics. Furthermore, the ejection characteristics at the time of ink jet recording are excellent, and the image quality of the obtained image is also excellent.

Here, as an aggregating agent for aggregating the components of the ink composition at the time of recording by the ink jet recording method, recording may be carried out using a reaction liquid including a polyvalent metal salt, a cationic compound (a cationic resin, a cationic surfactant, or the like), an organic acid, and the like. In this case, the coloring material and the resin in the ink are aggregated by the aggregating agent, and this aggregate inhibits penetration of the pigment into the recording medium, thus, the ink is excellent in terms of improving the image quality of the recorded image.

2. Examples

A more specific description will be given below of embodiments of the invention with reference to Examples and Comparative Examples, but the present embodiment is not limited to only these Examples. In the Examples and Comparative Examples, "parts" and "%" are on a mass basis unless otherwise specified.

2.1. Preparation of Ink Composition

The ink compositions of Examples 1 to 9 and Comparative Examples 1 to 4 were obtained by mixing and stirring each component at the blending ratios in Table and carrying out filtering through a membrane filter having a pore size of 5 μm. Here, the values in Table represent the content (% by mass) in the ink, and water was added such that the total mass of the ink composition was 100% by mass. The pigment is represented by the solid content concentration.

TABLE

| Material Name | Boiling point °C. | Example 1 | Example 2 | Example 3 | Example 4 | Example 5 | Example 6 | Example 7 | Example 8 |
|---|---|---|---|---|---|---|---|---|---|
| Self-dispersion type pigment | — | 40 | 40 | 40 | 40 | 40 | 40 | 40 | 40 |
| Resin-dispersed pigment | — | — | — | — | — | — | — | — | — |
| 3-methyl-1,5-pentanediol (MPD) | 250 | 8 | 6 | 4 | 3 | 4 | 4 | 4 | 6 |
| Trimethylolpropane (TMP) | — | 1 | 3 | 5 | 6 | 5 | 5 | 5 | 3 |
| Diethylene glycol-2-ethylhexylether (EHDG) | 272 | 0.3 | 0.3 | 0.3 | 0.3 | 0.3 | 0.3 | 0.3 | 0.3 |
| 1,2-Hexanediol | 224 | — | — | — | — | 0.5 | — | — | — |
| Glycerine | 290.5 | 10 | 10 | 10 | 10 | 10 | 7 | 13 | 10 |
| Silicon-based surfactant | — | 0.2 | 0.2 | 0.2 | 0.2 | 0.2 | 0.2 | 0.2 | 0.2 |
| Pure water | — | Remainder | Remainder | Remainder | Remainder | Remainder | Remainder | Remainder | Remainder |
| TMP/MPD (Ratio) |  | 0.125 | 0.5 | 1.25 | 2 | 1.25 | 1.25 | 1.25 | 0.5 |
| Head |  | Head 1 | Head 1 | Head 1 | Head 1 | Head 1 | Head 1 | Head 1 | Head 2 |
| Low-temperature characteristics |  | C | B | A | A | A | C | A | A |
| Intermittent printability |  | A | A | A | A | A | B | A | B |
| Color development (OD value) |  | A | A | A | A | A | A | A | A |
| VOC |  | A | A | A | A | B | A | A | A |
| Ejection characteristics |  | A | A | A | B | A | B | B | A |

| Material Name | Boiling point °C. | Example 9 | Comparative Example 1 | Comparative Example 2 | Comparative Example 3 | Comparative Example 4 |
|---|---|---|---|---|---|---|
| Self-dispersion type pigment | — | — | 40 | 40 | 40 | 40 |
| Resin-dispersed pigment | — | 40 | — | — | — | — |
| 3-methyl-1,5-pentanediol (MPD) | 250 | 6 | — | 9 | 2 | 4 |
| Trimethylolpropane (TMP) | — | 3 | 5 | — | 7 | 5 |
| Diethylene glycol-2-ethylhexylether (EHDG) | 272 | 0.3 | 0.3 | 0.3 | 0.3 | 0.3 |
| 1,2-Hexanediol | 224 | — | 4 | — | — | 0.6 |
| Glycerine | 290.5 | 10 | 10 | 10 | 10 | 10 |
| Silicon-based surfactant | — | 0.2 | 0.2 | 0.2 | 0.2 | 0.2 |
| Pure water | — | Remainder | Remainder | Remainder | Remainder | Remainder |
| TMP/MPD (Ratio) |  | 0.5 | — | 0 | 3.5 | 1.25 |
| Head |  | Head 1 | Head 1 | Head 1 | Head 1 | Head 1 |
| Low-temperature characteristics |  | A | B | D | A | A |
| Intermittent printability |  | A | A | A | A | A |
| Color development (OD value) |  | B | A | A | A | A |
| VOC |  | A | D | A | A | D |
| Ejection characteristics |  | A | A | A | D | A |

Details of the materials used are as follows.

Pigment

Self-dispersing type pigment: carbon black (trade name "Aqua Black 162", manufactured by Tokai Carbon Co., Ltd., self-dispersing type, C.I. Pigment Black 7)

Resin-dispersed pigment: A pigment dispersion liquid in which a resin is dispersed with a resin dispersant was used.

75 parts by mass of Color Black S170 (trade name, manufactured by Daicel-Evonik Ltd.) as carbon black, 30 parts by mass of styrene-acrylic acid-based dispersing resin JONCRYL 611 (trade name: manufactured by BASF Japan Ltd.), 1.70 parts by mass of hydroxylated potassium, and 250 parts by mass of ultrapure water refined by the ion-exchange method and reverse osmosis method were mixed and dispersed for 10 hours by a ball mill with zirconia beads. The obtained dispersion base liquid was filtered through glass fiber filter paper GA-100 (trade name, manufactured by Advantec Toyo Kaisha, Ltd.) to remove coarse particles, adjusted to have a pigment concentration of 15% by mass, and a pigment dispersion liquid dispersed with a resin dispersant was obtained.

Penetrating Agent

MPD: 3-methyl-1,5-pentanediol (standard boiling point 250° C.)

EHDG: 2-ethylhexyl diglycol (standard boiling point 272° C.)

1,2-HD: 1,2-hexanediol (standard boiling point 224° C.)

Anti-Freezing Agent

TMP: trimethylolpropane

Moisturizing Agent

Glycerine (standard boiling point 290.5° C.)

Surfactant

BYK 348 (trade name, silicone-based surfactant, manufactured by BYK Japan K.K.)

2.2. Preparation of Ink Jet Recording Apparatus

An ink jet recording apparatus provided with the ejection heads illustrated in FIG. 1 to FIG. 4 described above was prepared. In Table, the ejection head of this ink jet recording apparatus is referred to as a "head 1".

Figure 6:
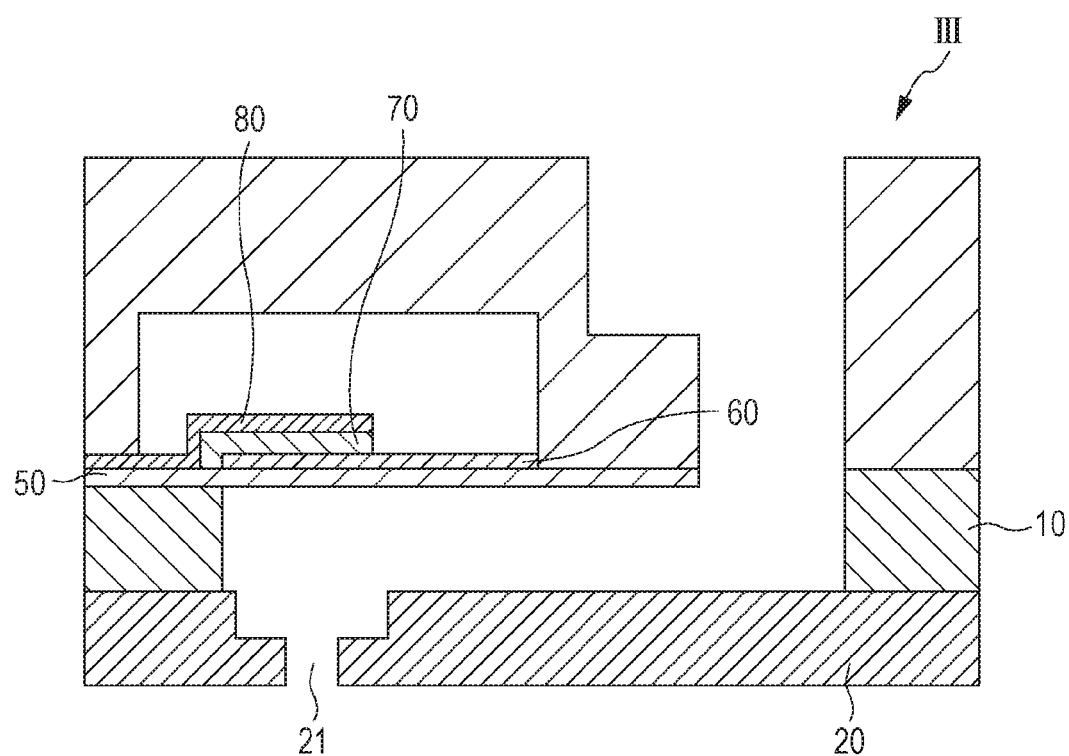
FIG. 6 is an enlarged cross-sectional view schematically showing a main portion of an ejection head (head 2).

On the other hand, an ink jet recording apparatus was prepared in which the structure corresponding to FIG. 4 for the ejection head of the ink jet recording apparatus was the structure as shown in FIG. 6. In Table, the ejection head of this ink jet recording apparatus is referred to as a "head 2". As shown in FIG. 6, since the liquid flow path of the head 2 has a structure including a liquid flow path extending in the planar direction and having the vibrating plate 50 and one liquid flow path in the vertical direction connected to the liquid flow path, the flow path volume upstream of the nozzle is small in comparison with that of the head 1 described above.

2.3. Evaluation Test 2.3.1. Evaluation of Low-Temperature Characteristics

After confirming the initial printing state (dot landing position misalignment or missing dots) of the head of the ink jet printer of either the head 1 or the head 2 and washing the head, the ink composition prepared above was filled therein. Thereafter, the head was fixed to a standing jig and the upstream of the self-sealing valve was choked, and the head was put in a thermostat set to specified temperature conditions and left for 12 hours. Thereafter, the head was taken out from the thermostat and washed, the presence or absence of freezing cracks was confirmed from the presence or absence of changes in the printing state, and evaluation was carried out according to the following criteria.

Evaluation Criteria

A: Freezing cracks do not occur at −13° C. or higher and −10° C. or lower.

B: Freezing cracks do not occur at −10° C. or higher and −7° C. or lower.

C: Freezing cracks do not occur at −7° C. or higher and −5° C. or lower.

D: Freezing cracks occur at −7° C. or higher and −5° C. or lower.

2.3.2. Evaluation of Intermittent Printability

The ink composition prepared above was filled into the head of an ink jet printer of either the head 1 or the head 2. All the nozzles ejected ink onto photographic paper (gloss) (manufactured by Seiko Epson Corp.). After that, the carriage was run idly for 12 seconds and then the ink was ejected from all the nozzles onto the photographic paper (gloss). The intermittent characteristics were evaluated based on the following criteria according to the landing position misalignment of dots before and after idle running.

Evaluation Criteria

A: Landing misalignment is 0 μm or more and less than 100 μm.

B: Landing misalignment is 100 μm or more and less than 200 μm.

C: Landing misalignment is 200 μm or more and less than 300 μm.

D: Landing deviation is 300 μm or more.

2.3.3. Evaluation of Color Development Property (OD Value)

The ink compositions prepared above were filled in the heads of an ink jet printer, which were either head 1 or head 2. After filling, solid printing was carried out with 1440×720 dpi and an ink weight of 24 ng on photomat paper/pigment exclusive use (manufactured by Seiko Epson Corp.). After drying the printed matter, the reflection density value (OD value) was measured with a Spectrolino (trade name, manufactured by Gretag Macbeth) and evaluated according to the following criteria.

Evaluation Criteria

A: OD value is 2.1 or more.

B: OD value is 2.0 or more and less than 2.1.

C: OD value is 1.9 or more and less than 2.0.

D: OD value is less than 1.9.

2.3.4. Evaluation of VOC

Using the ink jet printer of either head 1 or head 2, measurement was carried out according to the accreditation standard "Image Equipment such as Copiers and Printers (Version 1.2)" in Eco Mark Product Category No. 155 by Japan Environment Association, which is a Japanese public Corp. foundation, and evaluation was carried out according to the following criteria. First, a printer filled with ink was set in a test chamber set at a temperature of 23° C. and a humidity of 50%, and the ink was equilibrated overnight. The following day, the chemical substances emitted when activating the printer and the chemical substances emitted when printing were measured.

Evaluation Criteria

A: VOC is less than 39 mg/h (up to A0+) and VOC is less than 55 mg/h (B0 or more).

B: VOC is 39 mg/h or more (B0 or more), VOC is 55 mg/h or more (B0 or more).

2.3.5. Evaluation of Ejection Characteristics

The ink composition prepared above was filled in the head of an ink jet printer of either the head 1 or the head 2 and the ink was ejected at an appropriate voltage Vh and an appropriate voltage Vh+3V and evaluated according to the following criteria.

Evaluation Criteria

A: Normal ejection with all nozzles.

B: No more than 1 nozzle missing during ejection.

C: Two or more and five or less nozzles missing during ejection.

D: More than 5 nozzles missing during ejection.

2.4. Evaluation Result

The results of the evaluation test are shown in the lower part of Table.

As shown in Table, the occurrence of freezing cracks and generation of VOC were reduced in all Examples, and the ejection characteristics were excellent. In detail, from Examples 1 to 4, as the ratio of TMP/MPD was higher, freezing cracks did not occur even at lower temperatures, but it was understood from the relationship with ejection characteristics that the ratio of TMP/MPD was most suitably 1.25. In addition, according to Examples 3 and 5, VOC was generated when 0.5% by mass of 1,2-hexanediol was included. In addition, from Examples 3, 6, and 7, when the content of glycerine in the ink is lowered, the low-temperature characteristics and ejection characteristics tend to be lowered, and when the content of glycerine in the ink increases, the ejection characteristics tend to deteriorate. From Examples 2 and 8, since the flow path volume of the head 1 upstream of the nozzle was larger than that of the head 2, the intermittent printability was improved. In addition, from Examples 2 and 9, when a self-dispersion type pigment is used as the pigment, it is possible to increase the pigment concentration in the ink, thus, the printing density is improved as compared with Example 9 in which the resin dispersion type pigment was used, and the evaluation of the color development was high.

In any of the Comparative Examples, it was not possible to obtain an ink composition excellent in low-temperature characteristics and ejection characteristics while reducing the amount of VOC generated, as compared with the Examples. Specifically, in Comparative Example 1, since 1,2-hexanediol, which is an organic solvent having a standard boiling point lower than 250° C., was used as a penetrating agent instead of MPD, the amount of VOC generated was high as a result. In Comparative Example 2, since TMP was not included, freezing cracks occurred. In Comparative Example 3, since the ratio of TMP/MPD was out of the range of 0.12 to 2, the ejection characteristics were deteriorated. In Comparative Example 4, since 1,2-hexanediol was contained in an amount of more than 0.5% by mass, the amount of VOC generated was high as a result.

As described above, in Examples 1 to 9, the ink composition contains 3-methyl-1,5-pentanediol, trimethylolpropane, water, and a pigment, in which no more than 0.5% by mass of 1,2-hexanediol is contained, and a mass ratio of the trimethylolpropane to the 3-methyl-1,5-pentanediol is 0.12 or more and 2 or less, and, due to this, it is possible to obtain an ink composition with excellent low-temperature characteristics and ejection characteristics while reducing the amount of VOC generated when carrying out recording using the ink jet recording method.

The invention is not limited to the embodiments described above, and various modifications are possible. For example, the invention includes configurations substantially the same as the configuration described in the embodiments (for example, configurations having the same function, methods, and results, or a configuration having the same object and effects). In addition, the invention includes configurations in which non-essential parts of the configuration described in the embodiments are replaced. In addition, the invention includes configurations which achieve the same operation and effects as the configurations described in the embodiment, or configurations which are able to achieve the same object. In addition, the invention includes configurations in which a publicly-known technique is added to the configuration described in the embodiment.

The entire disclosure of Japanese Patent Application No. 2017-117718, filed Jun. 15, 2017 is expressly incorporated by reference herein.

What is claimed is:

1. An ink composition comprising:
   3-methyl-1,5-pentanediol;
   trimethylolpropane;
   diethylene glycol-2-ethylhexyl ether in an amount that ranges between 0.1% by mass or more and 0.5% by mass or less relative to a total mass of the ink composition;
   water; and
   a pigment,
   wherein no more than 0.5% by mass of 1,2-hexanediol is contained, and
   a mass ratio of the trimethylolpropane to the 3-methyl-1,5-pentanediol is 0.12 or more and 2 or less.

2. The ink composition according to claim 1,
   wherein a content of the 3-methyl-1,5-pentanediol is 3% by mass or more and 8% by mass or less with respect to a total mass of the ink composition.

3. The ink composition according to claim 1,
   wherein a content of the trimethylolpropane is 1% by mass or more and 6% by mass or less with respect to the total mass of the ink composition.

4. The ink composition according to claim 1, further comprising:
   a self-dispersion type pigment as the pigment.

5. The ink composition according to claim 1,
   wherein an organic solvent having a standard boiling point lower than 250° C. is not contained.

6. The ink composition according to claim 1, which is used in an ink jet recording apparatus provided with an ejection head which has
   a liquid flow path extending in a planar direction and having a vibrating plate, and
   a plurality of liquid flow paths connected to the liquid flow path in a vertical direction.

* * * * *